(12) United States Patent
Freitas et al.

(10) Patent No.: US 7,574,691 B2
(45) Date of Patent: Aug. 11, 2009

(54) METHODS AND APPARATUS FOR RENDERING USER INTERFACES AND DISPLAY INFORMATION ON REMOTE CLIENT DEVICES

(75) Inventors: Pedro Freitas, San Francisco, CA (US); Daniel Putterman, San Francisco, CA (US); Jeremy Toeman, San Francisco, CA (US); Brad Dietrich, San Francisco, CA (US)

(73) Assignee: Macrovision Corporation, Santa Clara, CA (US)

( * ) Notice: Subject to any disclaimer, the term of this patent is extended or adjusted under 35 U.S.C. 154(b) by 703 days.

(21) Appl. No.: 10/779,953

(22) Filed: Feb. 14, 2004

(65) Prior Publication Data

US 2004/0183756 A1 Sep. 23, 2004

(51) Int. Cl.
*G06F 9/44* (2006.01)
(52) U.S. Cl. ...................... 717/113; 717/176
(58) Field of Classification Search ......... 717/110–113, 717/174–178
See application file for complete search history.

(56) References Cited

U.S. PATENT DOCUMENTS

| | | |
|---|---|---|
| 5,479,601 A | 12/1995 | Matheny et al. |
| 5,506,932 A | 4/1996 | Holmes |
| 5,751,672 A | 5/1998 | Yankowski |
| 5,793,366 A | 8/1998 | Mano |
| 5,798,921 A | 8/1998 | Johnson et al. |
| 5,835,126 A | 11/1998 | Lewis |
| 5,883,621 A | 3/1999 | Iwamura |
| 5,943,680 A | 8/1999 | Shimizu et al. |
| 6,118,450 A | 9/2000 | Proehl |
| 6,208,341 B1 * | 3/2001 | van Ee et al. ............... 714/716 |
| 6,232,539 B1 | 5/2001 | Looney et al. |

(Continued)

FOREIGN PATENT DOCUMENTS

EP 1427148 11/2003

(Continued)

OTHER PUBLICATIONS

Haas et al., "Personalized News Through Content Augmentation and Profiling", Proceedings of ICIP 2002, Rochester, NY., pp. 1-4, Sep. 2002.*

(Continued)

*Primary Examiner*—Ted T Vo
(74) *Attorney, Agent, or Firm*—Andy T. Pho; Macrovision Patent Department

(57) ABSTRACT

A user interface is implemented on a client device remote from a host device. The host device operates an application program that implements a user interface, such as an electronic programming guide or a guide for a personal video recorder, that permits a user to control at least one target device. The host device transfers to the client device an identification of at least one scene. In general, a scene defines an abstract layout for at least one screen display of the user interface. The client device generates at least one screen display for the scene based on its interpretation of the scene. The client device then displays the screen as an implementation of the user interface. Thereafter, a user initiates, using the client device, an operation to control the target device. In response, the target device performs the operation. The host device may also display information at a client device. For example, the host device may transmit information about a media currently playing at the client device.

14 Claims, 17 Drawing Sheets

U.S. PATENT DOCUMENTS

| | | |
|---|---|---|
| 6,243,725 B1 | 6/2001 | Hempleman |
| 6,263,503 B1 | 7/2001 | Margulis |
| 6,289,165 B1 | 9/2001 | Abecassis |
| 6,324,681 B1 | 11/2001 | Sebesta et al. |
| 6,342,901 B1 | 1/2002 | Adler et al. |
| 6,356,971 B1 | 3/2002 | Katz |
| 6,393,430 B1 | 5/2002 | Van Ryzin |
| 6,466,080 B2 | 10/2002 | Kawai |
| 6,487,145 B1 | 11/2002 | Berhan |
| 6,505,343 B1 | 1/2003 | Menon et al. |
| 6,564,368 B1 | 5/2003 | Beckett et al. |
| 6,567,427 B1 | 5/2003 | Suzuki et al. |
| 6,574,617 B1 | 6/2003 | Immerman et al. |
| 6,577,735 B1 | 6/2003 | Bharat |
| 6,647,417 B1 | 11/2003 | Hunter |
| 6,657,116 B1 | 12/2003 | Gunnerson |
| 6,738,964 B1 | 5/2004 | Zink et al. |
| 6,741,617 B2 | 5/2004 | Rosengren |
| 6,751,402 B1 | 6/2004 | Elliot |
| 6,782,528 B1 | 8/2004 | Bennett et al. |
| 6,792,615 B1 | 9/2004 | Rowe et al. |
| 6,802,058 B2 | 10/2004 | Banavar et al. |
| 6,816,175 B1 | 11/2004 | Hamp et al. |
| 6,820,260 B1 | 11/2004 | Flockhart et al. |
| 6,826,512 B2 | 11/2004 | Dara-abrams |
| 6,865,593 B1 | 3/2005 | Reshef et al. |
| 6,868,448 B1 | 3/2005 | Gupta et al. |
| 6,892,228 B1 | 5/2005 | Penders |
| 6,892,381 B2 | 5/2005 | Kim et al. |
| 6,898,601 B2 | 5/2005 | Amado et al. |
| 6,901,435 B1 | 5/2005 | Sulcer et al. |
| 6,901,603 B2 | 5/2005 | Zeidler |
| 6,925,200 B2 | 8/2005 | Wood et al. |
| 6,938,101 B2 * | 8/2005 | Hayes et al. .................... 710/5 |
| 7,039,643 B2 | 5/2006 | Sena |
| 7,127,516 B2 | 10/2006 | Inoue et al. |
| 7,231,175 B2 | 6/2007 | Ellis |
| 7,260,461 B2 | 8/2007 | Rao et al. |
| 2001/0026287 A1 | 10/2001 | Watanabe |
| 2001/0039660 A1 | 11/2001 | Vasilevsky |
| 2001/0042107 A1 | 11/2001 | Palm |
| 2002/0010652 A1 | 1/2002 | Deguchi |
| 2002/0046315 A1 | 4/2002 | Miller |
| 2002/0059588 A1 | 5/2002 | Huber |
| 2002/0059642 A1 | 5/2002 | Russ |
| 2002/0069746 A1 | 6/2002 | Taira |
| 2002/0070982 A1 | 6/2002 | Hill |
| 2002/0082901 A1 | 6/2002 | Dunning |
| 2002/0113824 A1 | 8/2002 | Myers |
| 2002/0166123 A1 | 11/2002 | Schrader |
| 2002/0174444 A1 | 11/2002 | Gratto |
| 2002/0180803 A1 | 12/2002 | Kaplan |
| 2002/0194260 A1 | 12/2002 | Headley |
| 2003/0035404 A1 | 2/2003 | Ozluturk |
| 2003/0110272 A1 | 6/2003 | Du Castel |
| 2003/0149988 A1 | 8/2003 | Ellis |
| 2003/0214955 A1 | 11/2003 | Kim |
| 2003/0220091 A1 | 11/2003 | Farrand |
| 2004/0031058 A1 * | 2/2004 | Reisman ..................... 725/112 |
| 2004/0060063 A1 * | 3/2004 | Russ et al. ..................... 725/46 |
| 2004/0117788 A1 * | 6/2004 | Karaoguz et al. ........... 717/177 |
| 2004/0117831 A1 | 6/2004 | Ellis |
| 2004/0184763 A1 | 9/2004 | Defrancesco |
| 2004/0255326 A1 | 12/2004 | Hicks et al. |
| 2005/0028208 A1 | 2/2005 | Ellis |
| 2005/0039208 A1 | 2/2005 | Veeck |
| 2005/0227611 A1 | 10/2005 | Ellis |
| 2005/0246393 A1 | 11/2005 | Coates |
| 2006/0004685 A1 | 1/2006 | Pyhalammi |
| 2006/0080707 A1 | 4/2006 | Laksono |
| 2006/0259949 A1 | 11/2006 | Schaefer |

OTHER PUBLICATIONS

Dimitrova et al., "Personalizing Video Recorders using Multimedia Processing and Integration", ACM, pp. 564-567, 2001.*
U.S. Appl. No. 09/330,860, filed Jun. 11, 1999, Ellis.
U.S. Appl. No. 09/335,244, filed Jun. 11, 1999, Hansel.
U.S. Appl. No. 09/354,344, filed Jul. 16, 1999, Ellis.
U.S. Appl. No. 09/332,244, filed Jun. 11, 1999, Ellis.
International Search Report of the International Searching Authority for related foreign application PCT/US2006/049398.

* cited by examiner

METHODS AND APPARATUS FOR RENDERING USER INTERFACES AND DISPLAY INFORMATION ON REMOTE CLIENT DEVICES

CROSS-REFERENCES TO RELATED APPLICATIONS

This application claims the benefit of U.S. patent application Ser. No. 10/391,116, filed Mar. 17, 2003, entitled "Methods and Apparatus For Implementing A Remote Application Over A Network."

BACKGROUND OF THE INVENTION

1. Field of the Invention

The present invention is directed toward the field of network software and devices, and more particularly towards rendering user interfaces and displays on devices remote from a host device.

2. Art Background

Prior art techniques exist to "remote" applications. In general, a remote application is an application that runs on a first computer but provides the functionality of the application to a second computer (e.g., implements a user interface) remote from the first computer. Remote application techniques have been used in client-server environments, wherein the application programs are stored on a server, and the client computers accesses the server to obtain functionality from the applications. The X Windows environment remotes applications such that thin client computers, or terminals, access a computer, such as a server, over a network to obtain the application's functionality at the terminals. For example, a server may host a word processing application. The thin client computer or terminal communicates with a server to operate the word processing program. The application program, running on the server, implements the user interface at the local computer for the underlying application program.

One issue that arises when implementing remote applications is that the remote applications require specific knowledge about the display characteristics of the client computer or terminal. If the client-server environment has many client computers, then the remote application must know the requirements of each client computer. This limits the types of devices or computers that the remote application can support, or significantly increases complexity of the server software to support the various types of devices. Therefore, it is desirable to develop software that permits a remote application to operate on a client computer or device without requiring the remote application to have any knowledge of the client's configuration.

Typically, applications implement a user interface using a user interface tool kit, sometimes referred to as a widget set, a rendering engine, and underlying hardware to display the user interface. The application provides parameters to the user interface tool kit based on specifics of the application. For example, some applications define buttons, toolbars, menus, etc. for use with the application. The user interface tool kit provides specific layout information for the application requirements. For example, the user interface tool kit may specify placement of the buttons, toolbars and menus used in the application. This layout is sometimes referred to as a logical layout of the user interface. The rendering engine, which receives the logical layout from the user interface tool kit, defines how to translate the logical layout to a physical representation for rendering on an output display. For example, if the remote computer display is a graphics display, then the rendering engine may convert digital data to RGB data for storage in a frame buffer for rendering on the output display. The user interface hardware may include, for a graphics display, a frame buffer, graphics processor and raster scan display for rendering pixel data.

Typically, to remote an application, the application and user interface tool kit software are run on the remote computer (i.e., the computer running the remote application). The local computer (i.e., the computer providing the user interface) includes the rendering engine and display hardware. An interface between the remote computer and local computer defines specific parameters for displaying information on the local computer (e.g., screen resolution, graphics or textual display, color palettes supported, etc.). Using this interface, the remote application specifies a logical layout supported by the physical rendering of the local client. For example, the remote application may specify, in a logical layout, the toolbar at the top of the output display. In order to ensure that the toolbar is readable, the remote application knows the overall resolution of the output display on the local client. The rendering engine at the local client translates the data for the toolbar, and stores the graphics data in the frame buffer at the local client. The contents of the frame buffer are thereafter rendered on the local client's output display.

Internet technology uses markup languages and Web browsers to display Web applications on local computer displays. Using Web browser technology, the application running on the web server does not need to know the specifics of the client display characteristics. However, the application logic is typically tuned to a specific display resolution, particularly if the web page contains graphic information. Often times Web applications specify to the user at the local computer a viewing resolution for the Web site because the Web application was designed for that specific resolution. Thus, Web technology still requires the application to have specific knowledge of the display characteristics of a computer that displays Web pages. In addition, user interfaces on the Web are very disconnected, so as to require splitting the application logic between the server and the client (e.g., Javascript). Alternatively, the Web applications are not very smooth and interactive applications. Although Web technology may be useful because most users view the information from desktop or notebook computers with a pre-defined resolution, the technology is not effective for use in systems that integrate devices with different types of displays. Accordingly, it is desirable to develop a remote application technology that permits using local client displays for remote applications regardless of the type of display at the local client. It is also desirable to develop applications to utilize remote user interfaces and remote display of information.

SUMMARY OF THE INVENTION

A user interface is implemented on a client device remote from a host device. In one embodiment, the client device comprises a portable electronic device that includes a graphical display. The host device operates an application program that implements a user interface that permits a user to control at least one target device. For example, the user interface may comprise an electronic programming guide to control a television or a guide for a personal video recorder. In other embodiments, the user interface comprises an interface to control a media playback device. The host device transfers to the client device an identification of at least one scene. In one embodiment, the host and client devices communicate over a wireless network. In general, a scene defines an abstract layout for at least one screen display of the user interface. The client device generates at least one screen display for the scene based on its interpretation of the scene. The client device then displays the screen as an implementation of the user interface. Thereafter, a user initiates, using the client device, an operation to control the target device. In response, the target device performs the operation.

In other embodiments, the host device displays information at a client device. For this embodiment, the client device receives information from the host device for display at the client device. The client device may have an LCD or a graphical user interface. The host device may transmit information about media currently playing at the client device. For example, the host device may comprise a media server and the client device may comprise a playback device (e.g., CD player). For this application, the host device transmits information about the music playing at the playback device.

DETAILED DESCRIPTION

Media Convergence Platform:

A media convergence platform provides an efficient and easy way for one or more users to manage and playback media within a "media space." As used herein, a "media space" connotes one or more media storage devices coupled to one or more media players for use by one or more users. The integration of media storage devices and media players into a single media space permits distributed management and control of content available within the media space.

Figure 1:
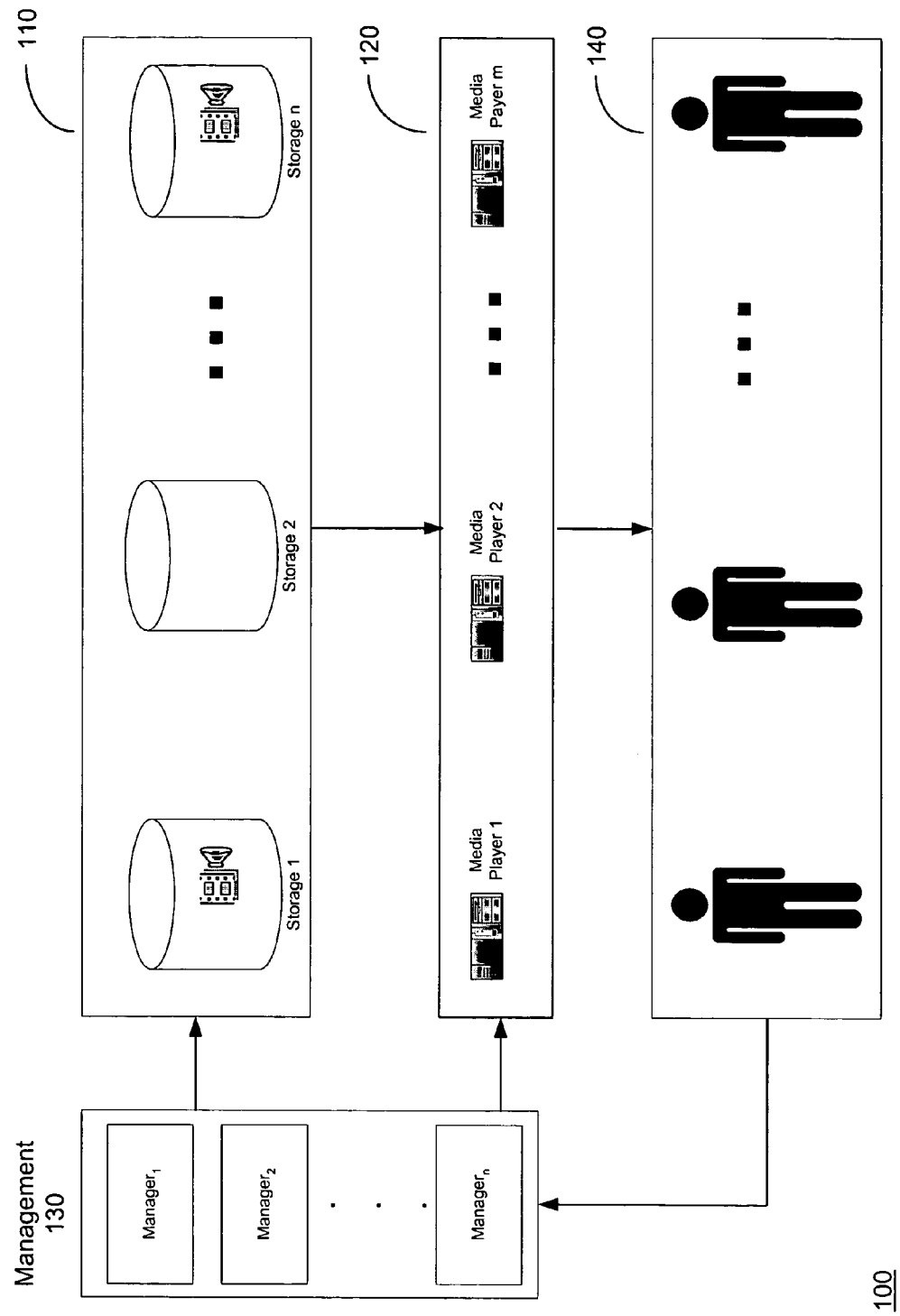
FIG. 1 illustrates a media space configured in accordance with one embodiment of the present invention.

FIG. 1 illustrates a media space configured in accordance with one embodiment of the present invention. As shown in FIG. 1, the media space 100 includes "n" media storage devices 110, where "n" is any integer value greater than or equal to one. The media storage devices 110 store any type of media. In one embodiment, the media storage devices 110 store digital media, such as digital audio, digital video (e.g., DVD, MPEG, etc.), and digital images. The media space 100 also includes "m" media players 120, where "m" is any integer value greater than or equal to one. In general, the media players 120 are devices suitable for playing and or viewing various types of media. For example, a media player may comprise a stereo system for playing music or a television for playing DVDs or viewing digital photos.

As shown in FIG. 1, the media storage devices 110 are coupled to the media players 120. The media storage devices 110 and the media players 120 are shown in FIG. 1 as separate devices to depict the separate functions of media storage and media playback; however, the media players may perform both the storage and playback functions. For example, a media player may comprise a DVD player that includes a hard drive for the storage and playback of digital video. In other embodiments, the storage of media and the playback/viewing of media are performed by separate devices. For this embodiment, the media players 120 playback content stored on the media storage devices 110. For example, a video clip stored on media storage device "1" may be played on any of the applicable "m" media players 120.

The storage devices 110 and media players 120 are controlled by management component 130. In general, management component 130 permits users to aggregate, organize, control (e.g., add, delete or modify), browse, and playback media available within the media space 100. The management component 130 may be implemented across multiple devices. The media space of FIG. 1 shows a plurality of users 140 to depict that more than one user may playback/view media through different media players. The system supports playback of different media through multiple media players (i.e., the system provides multiple streams of media simultaneously). The users 140, through management component 130, may also organize, control, and browse media available within the media space. The management component 130 provides a distributed means to manage and control all media within the media space.

Figure 2:
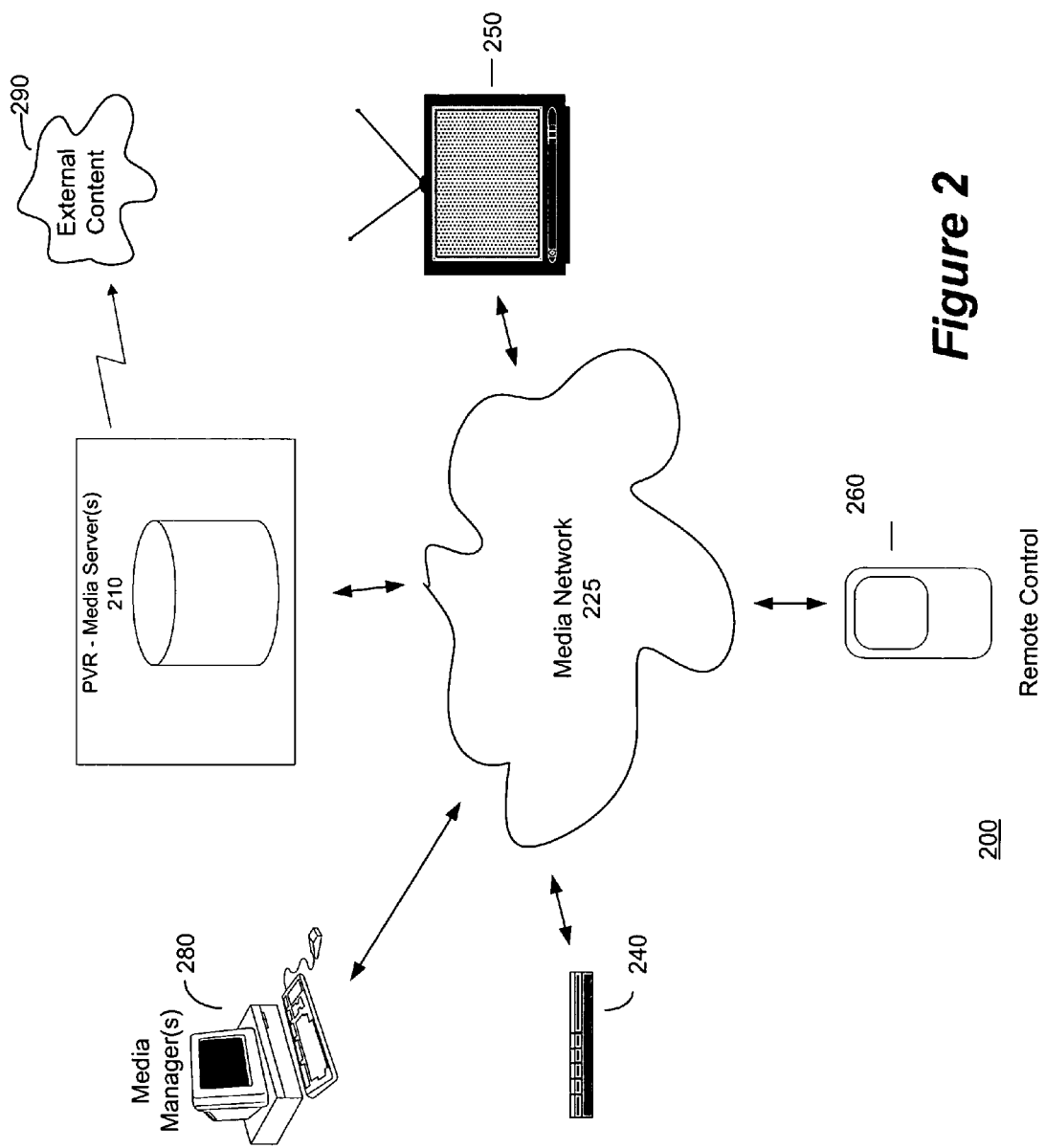
FIG. 2 illustrates one embodiment for integrating devices into a single media space.

FIG. 2 illustrates one embodiment for integrating devices into a single media space. For example, system 200, shown in FIG. 2, may be a home media system. For this embodiment, the media space 200 includes at least one personal video recorder ("PVR")-media server 210 (i.e., the media space may include many media servers). The media server 210 stores media for distribution throughout the media space 200. In addition, the media server 210 stores system software to integrate the components of the media space, to distribute media through the media space, and to provide a user interface for the components of the media space. The PVR-media server 210 may also include one or more television tuners and software to record television signals on a storage medium.

As shown in FIG. 2, the PVR-media server 210 is coupled to different types of media players, including one or more televisions (e.g., television 250) and one or more media players (e.g., audio and video playback devices), such as playback device 240. The media playback device may comprise AVR receivers, CD players, digital music players (e.g., MP3), DVD players, VCRs, etc. For this embodiment, the PVR-media server 210 is also coupled to one or more media managers 280 and to external content provider(s) 290.

For this embodiment, the PVR-media server 210 executes software to perform a variety of functions within the media space. Thus, in this configuration, the PVR-media server 210 operates as a "thick client." A user accesses and controls the functions of the media convergence platform through a system user interface. The user interface utilizes the thick and thin clients, as well as some media players (e.g., television 250 & media playback device 240). In one embodiment, the user interface includes a plurality of interactive screens displayed on media player output devices to permit a user to access the functionality of the system. A screen of the user interface includes one or more items for selection by a user. The user navigates through the user interface using a remote control device (e.g., remote control 260). The user, through use of a remote control, controls the display of screens in the user interface and selects items displayed on the screens. A user interface permits the user, through use of a remote control, to perform a variety of functions pertaining to the media available in the media space.

The components of the media convergence platform are integrated through a network. For example, in the embodiment of FIG. 2, the devices (e.g., PVR-media server 210, television 250, remote control 260, media player 240 and media manager 280) are integrated through network 225. Network 225 may comprise any type of network, including wireless networks. For example, network 225 may comprise networks implemented in accordance with standards, such as Ethernet 10/100 on Category 5, HPNA, Home Plug, IEEE 802.11x, IEEE 1394, and USB 1.1/2.0.

For the embodiment of FIG. 2, one or more thin video clients may be integrated into the media space. For example, a thin video client may be coupled to PVR-media server 210 to provide playback of digital media on television 250. A thin video client does not store media. Instead, a thin video client receives media from PVR-media server 210, and processes the media for display or playback on a standard television. For example, PVR-media server 210 transmits a digital movie over network 225, and the thin video client processes the digital movie for display on television 250. In one embodiment, the thin video client processes the digital movie "on the fly" to provide NTSC or PAL formatted video for playback on a standard television. A thin video client may be integrated into a television.

The media convergence platform system also optionally integrates one or more thin audio clients into the media space. For example, a thin audio client may receive digital music (e.g., MP3 format) from PVR-media server 210 over network 225, and may process the digital music for playback on a standard audio system. In one embodiment, the thin audio client includes a small display (e.g., liquid crystal display "LCD") and buttons for use as a user interface. The PVR-media server 210 transmits items and identifiers for the items for display on the thin audio client. For example, the thin audio client may display lists of tracks for playback on an audio system. The user selects items displayed on the screen using the buttons to command the system. For example, the thin audio client screen may display a list of albums available in the media space, and the user, through use of the buttons, may command the user interface to display a list of tracks for a selected album. Then, the user may select a track displayed on the screen for playback on the audio system.

The media manager 280 is an optional component for the media convergence platform system. In general, the media manager 280 permits the user to organize, download, and edit media in the personal computer "PC" environment. The media manager 280 may store media for integration into the media space (i.e., store media for use by other components in the media space). In one embodiment, the media manager 280 permits the user to perform system functions on a PC that are less suitable for implementation on a television based user interface.

The media space may be extended to access media stored external to those components located in the same general physical proximity (e.g., a house). In one embodiment, the media convergence platform system integrates content from external sources into the media space. For example, as shown in FIG. 2, the PVR-media server 210 may access content external to the local network 225. The external content may include any type of media, such as digital music and video. The media convergence platform system may be coupled to external content 290 through a broadband connection (i.e., high bandwidth communications link) to permit downloading of media rich content. The external content may be delivered to the media convergence platform system through use of the Internet, or the external content may be delivered through use of private distribution networks. In other embodiments, the external content may be broadcasted. For example, the media server 210 may access external content 290 through a data casting service (i.e., data modulated and broadcast using RF, microwave, or satellite technology).

Remote Applications:

As used herein, a "remote application" connotes software, operating on a device other than a local device, used to provide functionality on a local device. As described herein, the techniques of the present invention do not require the remote application to possess pre-existing information about the characteristics of the local display device (e.g., display resolution, graphics capabilities, etc.).

In one embodiment, the software system separates the user interface ("UI") application logic from the UI rendering. In one implementation, the system defines user interface displays in terms of "abstract scenes." In general, an abstract scene is a layout for a screen display, and it consists of logical entities or elements. For example, an abstract scene may define, for a particular display, a title at the top of the display, a message at the bottom the display, and a list of elements in the middle of the display. The scene itself does not define the particular data for the title, message and list. In one implementation, the software comprises pre-defined scenes, UI application logic, a scene manager, and UI rendering engine. In general, pre-defined scenes describe an abstract layout in terms of logical entities for a UI display. Typically, the application logic determines the scene and provides data to populate the scene based on the logical flow of the application. For example, a user may select a first item displayed on the current UI display. In response, the application logic selects, if applicable, a new abstract scene and data to populate the new scene based on the user selection.

The application logic is implemented independent of the scene and the UI rendering. The application logic selects a scene descriptor, to define an abstract layout, in terms of the abstract elements. The application logic then populates the logical elements with data, and transfers the abstract layout (scene descriptors) with data to the display client. A scene manager, running on the local client, interprets the scene descriptors based on the display capabilities of the display client. For example, if the display for a display client is only capable of displaying lists, then the scene manager translates the scene with data to display only lists. This translation may result in deleting some information from the scene to render the display. The scene manager may convert other logical elements to a list for display on the LCD display. The UI rendering engine renders display data for the scene with display elements particular to the output display for the display client. The display elements include display resolution, font size for textual display, the ability to display graphics, etc. For example, if the output device is a television screen, then the UI rendering engine generates graphics data (i.e., RGB data) suitable for display of the scene on the television screen (e.g., proper resolution, font size, etc.). If the output display is a liquid crystal display ("LCD"), the UI rendering engine translates the scene logical entities to a format suitable for display on the LCD display.

A user interface implementation that separates the UI application logic from the UI rendering has several advantages. First, the application logic does not require any information regarding the capabilities of the output display. Instead, the application logic only views the UI display in terms of logical entities, and populates data for those logic entities based on user input and logical flow of the user interface. Second, this separation permits a graphical designer of a user interface system to easily change the scenes of the user interface. For example, if a graphical designer desires to change a scene in the user interface, the graphical designer only changes the mapping from abstract to physical layout of the scene. During runtime, the application logic receives the revised scene descriptor, populates the revised scene descriptor with data via slots, and transmits the scene descriptor with data to the local client. Software on the local client determines those display elements to display the scene based on the device's display. Thus, a change to the scene does not require a change to the display elements particular to each output display because the conversion from the scene to the display elements occurs locally.

In one embodiment, the media convergence platform permits implementing user interface software remote from a device. In one implementation, the application logic is executed on a device remote from the device displaying a user interface. The device displaying the user interface contains the UI rendering software. For this implementation, the data and scenes for a user interface (e.g., scene descriptors) exist on a remote device. Using this implementation, the scene interface (interface between the scene descriptors and the application logic) is remote from the device rendering the display. The remote device (e.g., server) does not transfer large bitmaps across the network because only scene descriptor information with data is transferred. This delineation of functions provides a logical boundary between devices on a network that maximizes throughput over the network. In addition, a remote device hosting the application logic does not require information regarding display capabilities of each device on the home network. Thus, this implementation pushes the UI rendering software to the device rendering the images, while permitting the application logic to reside on other devices. This architecture permits implementing a thin client in a media convergence platform because the thin client need not run the application logic software. In addition, the architecture permits implementing a "thin application server" because the application server does not need to know about every possible rendering client type.

Figure 3:
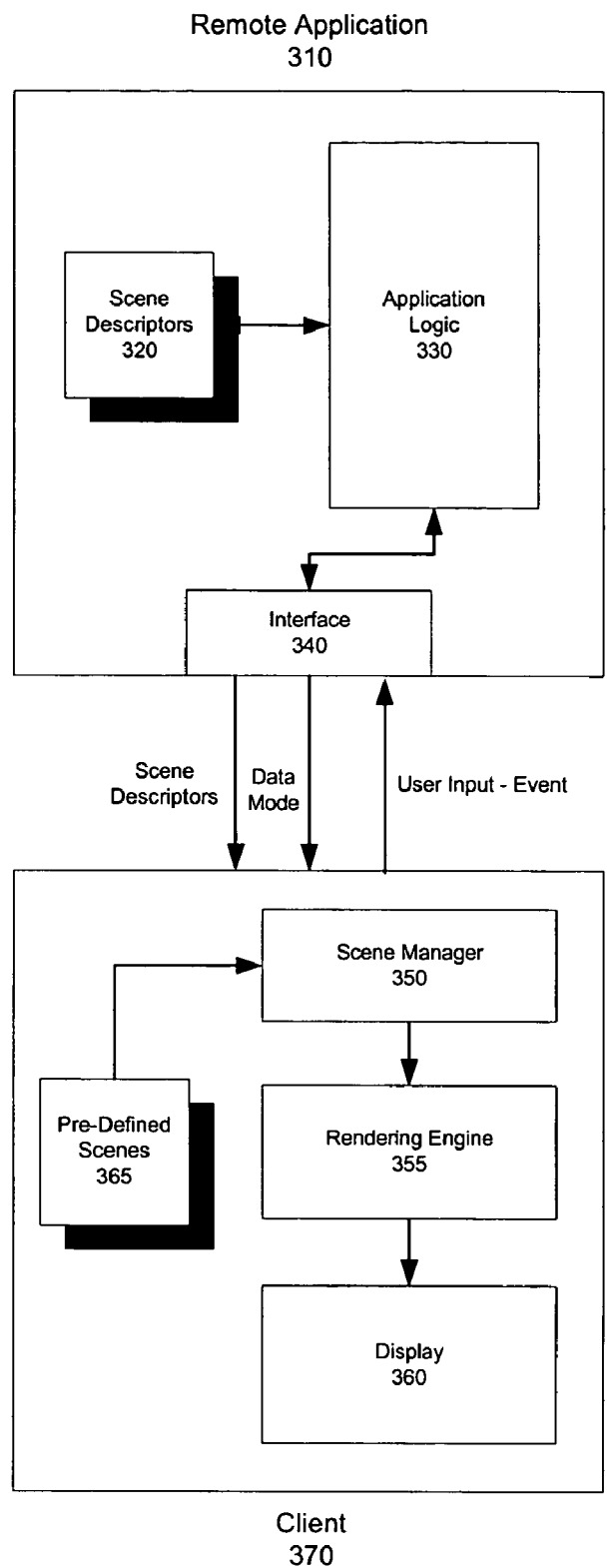
FIG. 3 is a block diagram illustrating one embodiment for implementing a remote application.

FIG. 3 is a block diagram illustrating one embodiment for implementing a remote application. For this example embodiment, a remote application 310 includes scene descriptors 320 and application logic 330. For example, remote application 310 may comprise a media server with considerable processing capabilities, such as a computer or set-top box. A client device, 370, has a display 360, for displaying information to a user (e.g., displaying data to implement a user interface), a rendering engine 355, and a scene manager 350. The rendering engine 355 receives, as input, data model from scene manager 350, and generates, as output, display data. The display data is a type of data necessary to render an image on the display 360. For example, if the display 360 comprises a graphics display, then display data includes information (e.g., RGB data) to render a graphical image on a display.

FIG. 3 illustrates separating a UI rendering, implemented on a client device, from application logic implemented on a remote device (310). In an example operation, a list of objects (e.g., musical albums) may be displayed on display 360. In this example, the user may select an album for playback. A scene descriptor (320) may define an abstract layout for this application. For example, the scene descriptor may define a list of audio track elements and control information. The application logic 330 receives the scene descriptor. The application logic 330 populates the elements of the scene descriptor with data particular to the selection. Thus, for this example, application logic 330 populates the list of audio track elements with the names of the audio tracks for the album selected by the user. The application logic 330 then transmits, through interface 340, the scene data to the scene manager 350 on client 370. The scene manager 350 converts the scene elements with data to the display elements. The rendering engine 355 generates data in a format suitable for display on display 360. For example, if display 360 is an LCD display, then rendering engine 355 generates a textual list of audio tracks. In another example, if display 360 is a graphics display, then rendering engine 355 generates graphics data (e.g., RGB), for the list of audio tracks.

In one embodiment, the techniques use "abstract scenes", defined by scene descriptors, to implement a user interface. In one embodiment, each application communicates in terms of at least one scene descriptor. A scene descriptor, in its simplest form, may constitute a list (e.g., a list scene). In general, a scene descriptor defines a plurality of slots and the relative locations of those slots for rendering the scene on an output display. The slots of a scene provide the framework for an application to render specific information on a display. However, an abstract scene defined by a scene descriptor does not define specific content for a slot. The abstract scene is developed in the application layout section on the remote computer (i.e., the computer operating the remote application).

In one embodiment, the system divides labor between the remote application computer and the local display computer through use of scene descriptors. Specifically, the remote application communicates the scene descriptor, in terms of logical coordinates, to the local display computer. The local display computer translates the scene descriptor based on its underlying display capabilities. In other embodiments, the remote application may define additional information about a scene, so as to shift more UI operations to the remote application. In yet other embodiments, the remote application may provide less information about a scene, thereby assigning more UI operations to the local client computer.

Figure 4:
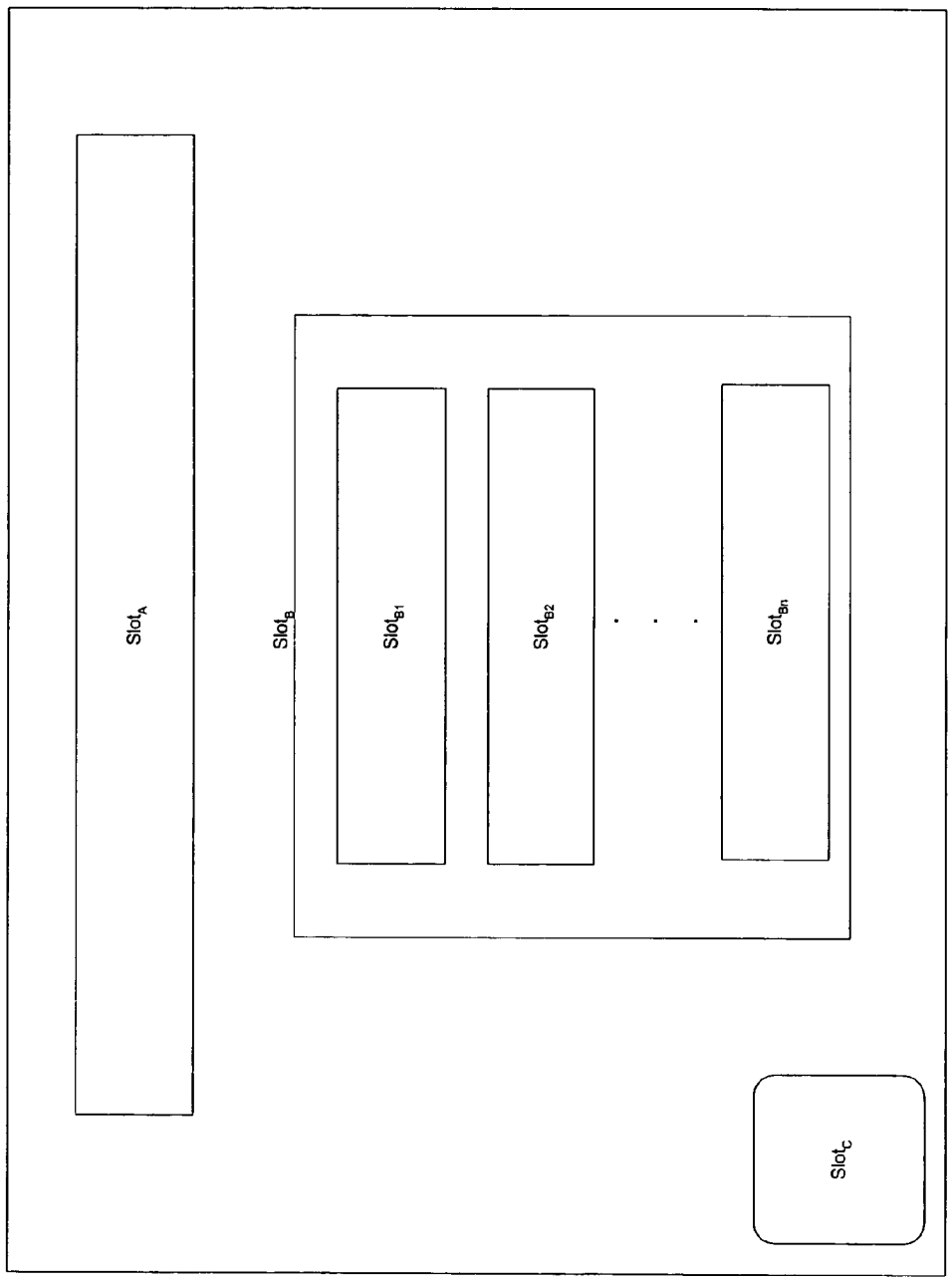
FIG. 4 is a block diagram illustrating an example abstract scene layout.

As an example, a scene descriptor may include one or more titles, a message, and a list of elements. FIG. 4 is a block diagram illustrating an example scene descriptor. As shown in FIG. 4, the example scene includes a plurality of slots (i.e., A, B and C). A $slot_A$, located on the top of the scene, may be used to display a major title (e.g., the title of the application). $Slot_B$, located in the center of the scene, includes a plurality of elements, 1-n, to display a list. For example, $slot_B$ may be used by the application to display menu items. For this example, each subcomponent (e.g., $slot_{B1}$, $slot_{B2}$ ... $slot_{Bn}$) may represent a menu item. In one application, the menu items comprise media items (e.g., music, video, etc.) available in a media system. The number of menu items displayed may be variable and dependent upon the display capabilities of the local computer. The third slot shown in FIG. 4, slot$_C$ is displayed in the lower left corner. The remote application may use slot$_C$ to display an icon (e.g., a logo for the remote application software publisher).

In one embodiment, the remote application constructs a list of elements for a scene descriptor, which includes data for display in the slots, and transfers the list of elements in a block defined by the interface (e.g., interface 340, FIG. 3) to the local display device. In one embodiment, the remote application interrogates the scene (at the client) to determine the number of visible elements for display, and then retrieves the list items for those visible elements. For example, the list elements may include a data model, abstract interface model, raw string, etc.

In one embodiment, "widgets", a software implementation, are used in the user interface For this embodiment, an abstract scene is implemented with a collection of widgets. A widget corresponds to one or more slots on an abstract scene. In one implementation, a widget comprises a controller, model, and view subcomponents. A view is an interpretation of the abstract scene suitable for a specific display. For example, a first view of an abstract scene may be suitable for rendering on a graphical display, and a second view of an abstract scene may be suitable for rendering the abstract scene on an LCD display. The model provides the underlining data for slots of an abstract scene. For example, if a slot consists of a list of menu items, then the model for that slot may include a list of text strings to display the menu items. Finally, a controller provides the logic to interpret user interface events (i.e., user input to the user interface). For example, if a user selects a menu item displayed on the user interface, an event is generated to indicate the selection of the item. The controller provides the logic to interpret the event, and initiate, if necessary, a new model and view.

Figure 5:
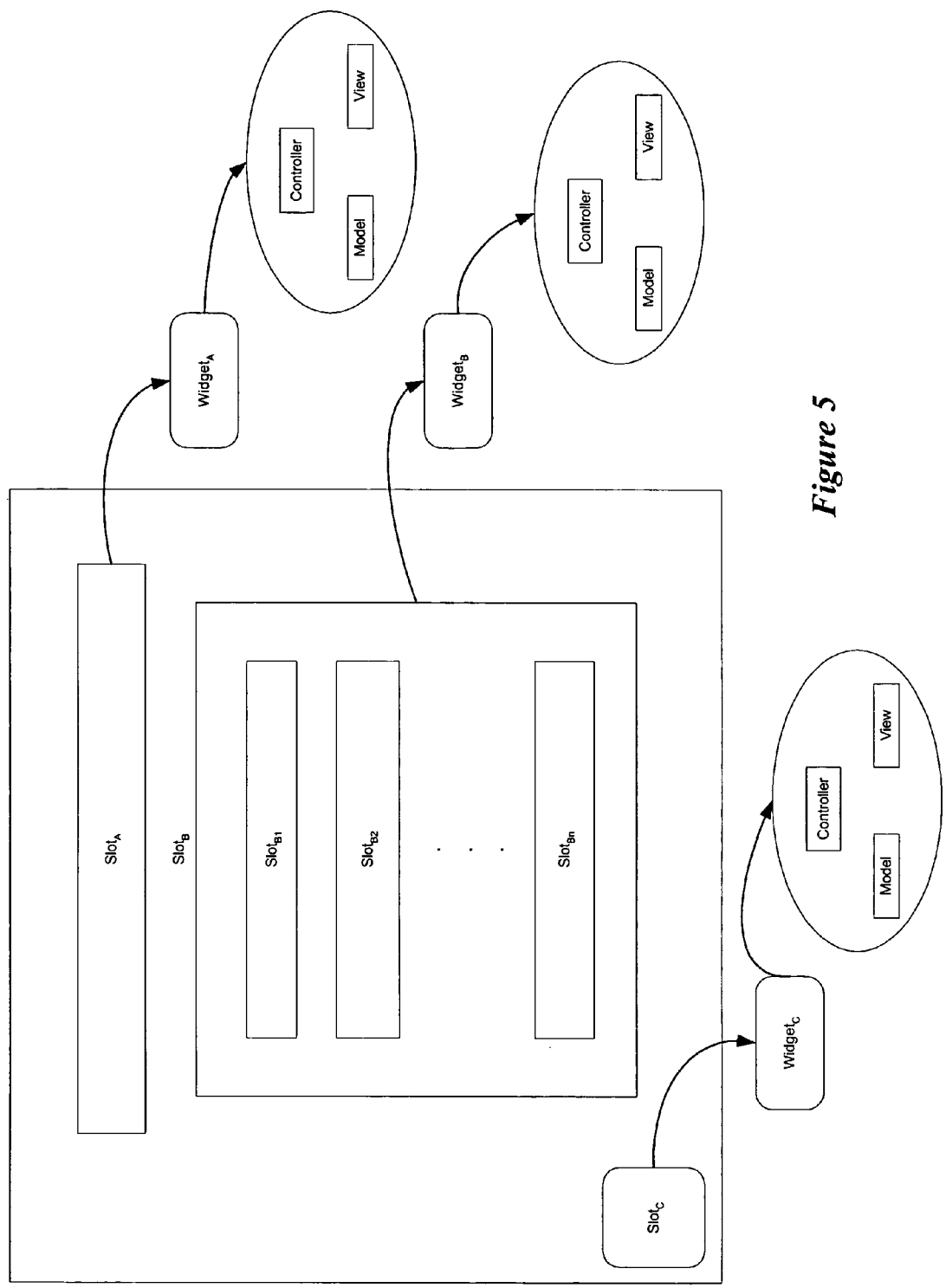
FIG. 5 is a block diagram illustrating one embodiment for implementing an abstract scene with widgets.

FIG. 5 is a block diagram illustrating one embodiment for implementing an abstract scene with widgets. The example abstract scene of FIG. 4 is shown in FIG. 5. A widget corresponds to each slot on the abstract scene. Specifically, widget$_A$ is instantiated for slot$_A$, widget$_B$ is instantiated for slot$_B$, and widget$_C$ is instantiated for slot$_C$. Also, as shown in FIG. 5, each widget (A, B and C) includes a controller, model and view. Note that slot$_B$ on the abstract interface includes a number of subcomponents. Widget$_B$ may be configured to render slot$_B$, and its subcomponents.

Figure 6:
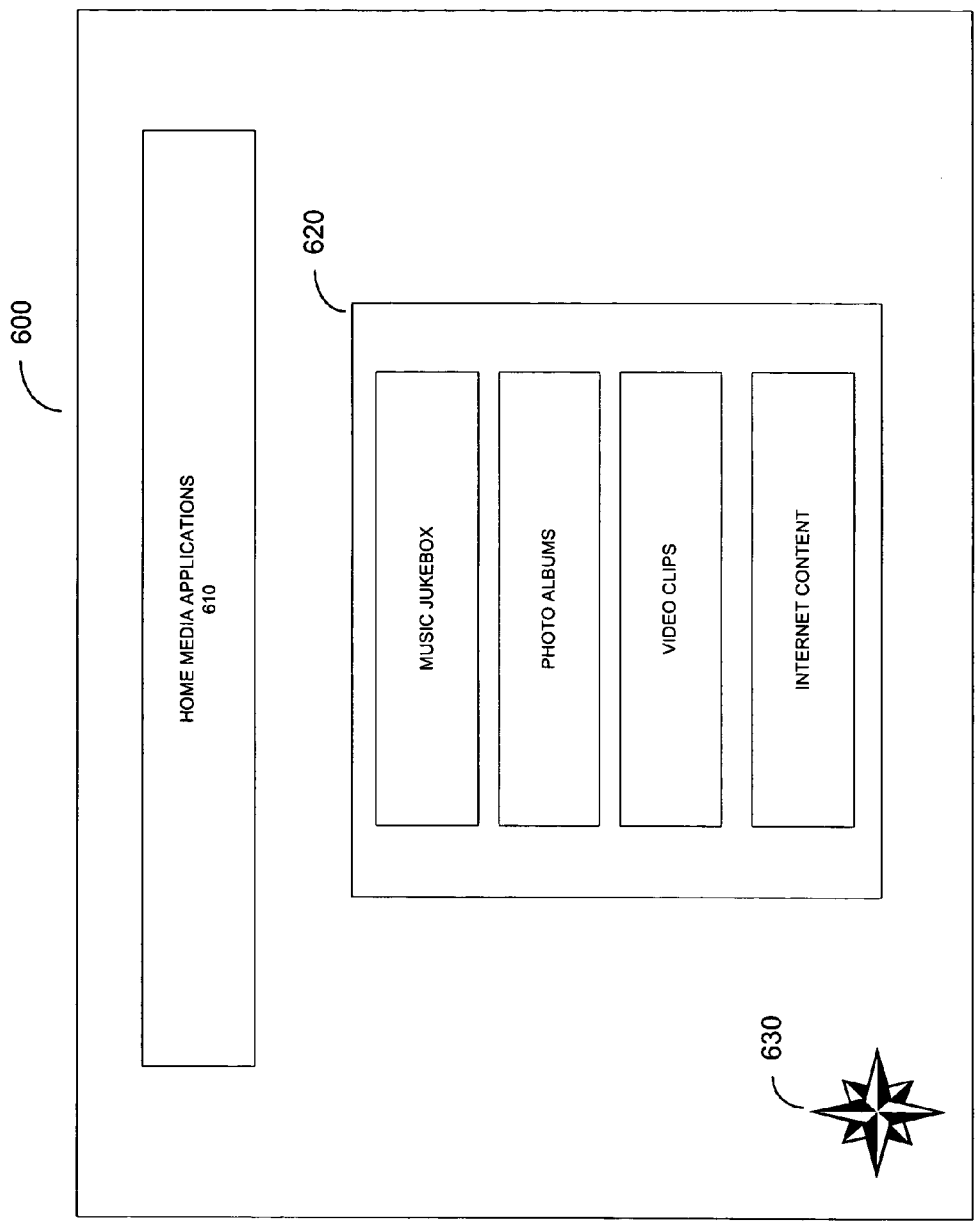
FIG. 6 illustrates an example screen display generated for a graphics display.
Figure 7:
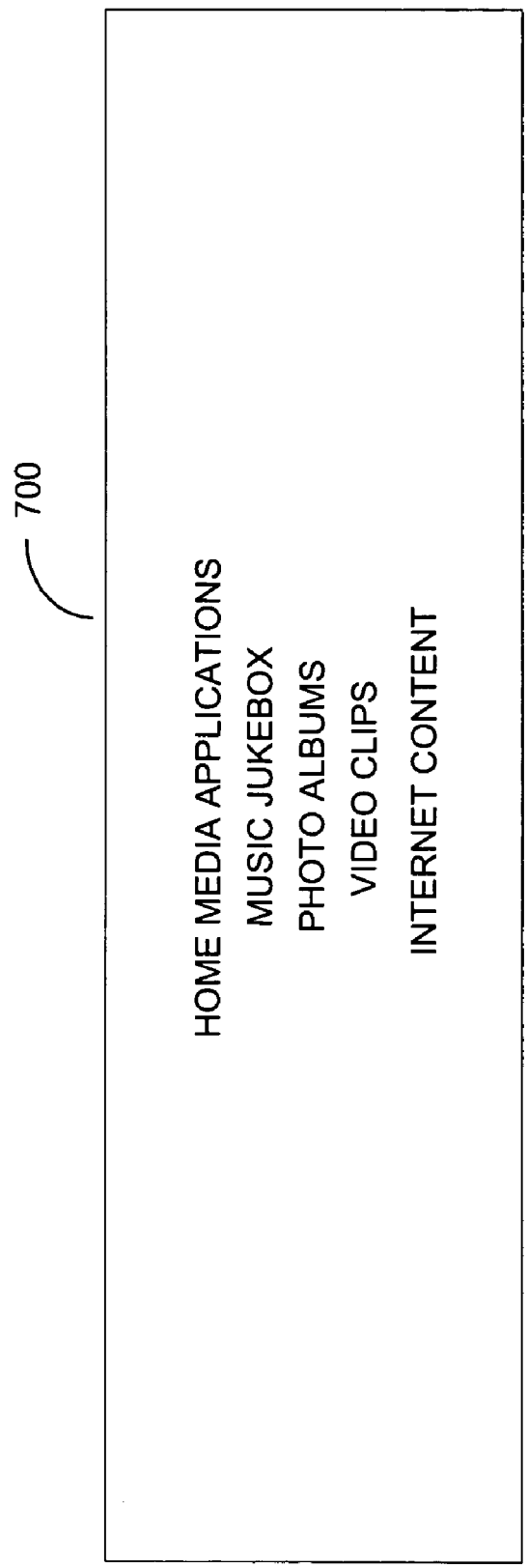
FIG. 7 illustrates an example screen display generated for a liquid crystal display ("LCD").

FIGS. 6 and 7 illustrate two different example screens supported by the techniques of the present invention. An example user interface display (e.g., screen) for a graphics display is shown in FIG. 6. A second example screen for a liquid crystal display ("LCD") is shown in FIG. 7. The example screens utilize the example scene descriptor of FIG. 4. The text string "Home Media Applications" is populated in Slot$_A$ (FIG. 4) on screen 600 of FIG. 6 and on screen 700 of FIG. 7. However, the underlying widget for screen 600 presents the text string, "Home Media Applications", in a box. For the LCD display 700, the text string "Home Media Applications" is displayed on the first line of the display. Slot$_B$ (FIG. 4) contains a plurality of elements. For this example, the elements represent menu items (i.e., home media applications available). Each element (i.e., "Music Jukebox", "Photo Albums", "Video Clips", and "Internet Content") is individually displayed in a graphics box on display 600. For display 700, the menu items are displayed on individual lines of the LCD display. A third slot, Slot$_C$, for the scene descriptor (FIG. 4) is displayed on screen 600 as a graphical symbol. The LCD display 700 (FIG. 7) can't display graphics, and therefore the graphics symbol is not displayed. The example user interface displays of FIGS. 6 and 7 illustrate two different screens generated for the same remote application.

Figure 9:
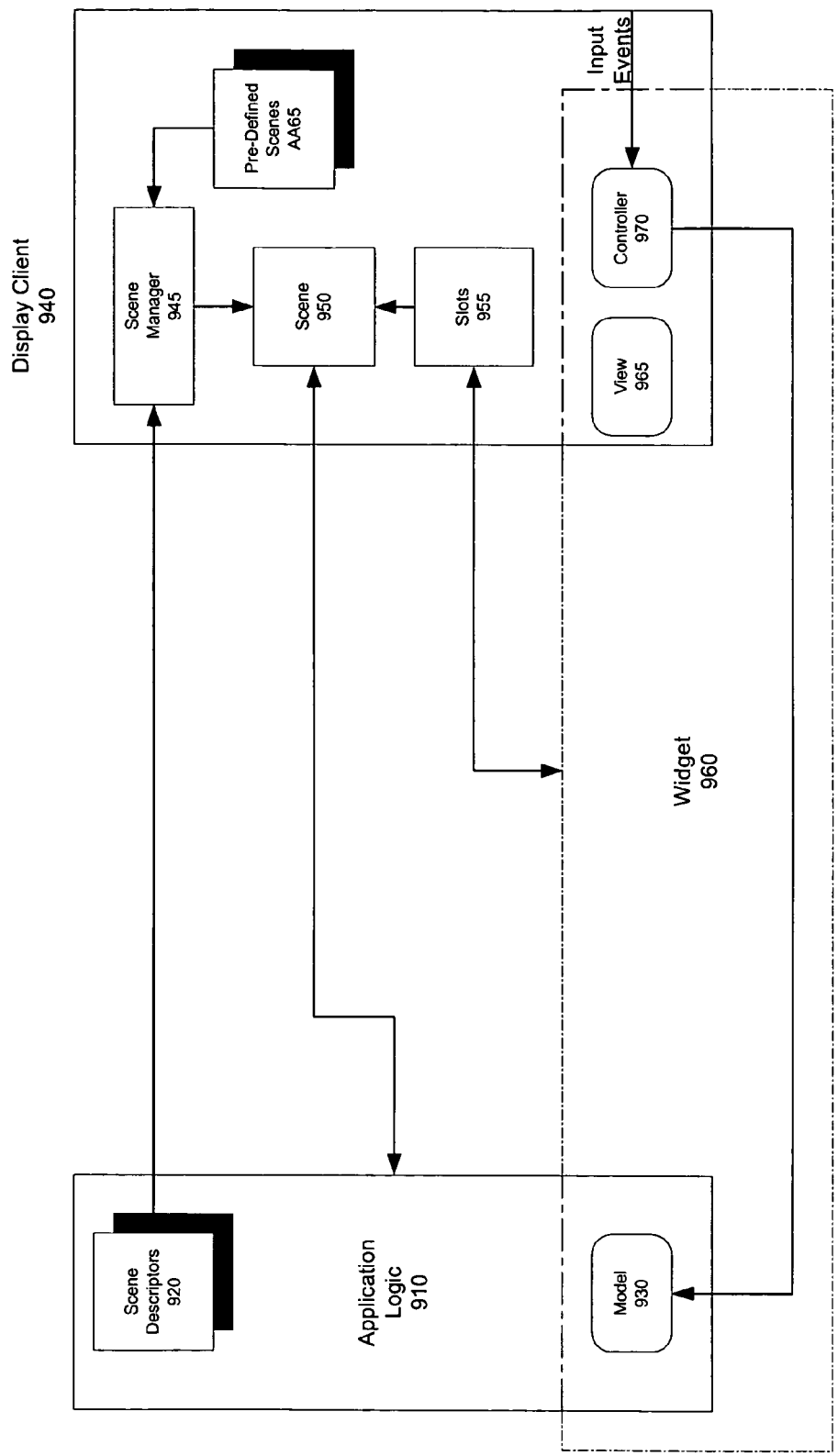
FIG. 9 is a block diagram illustrating another embodiment for implementing a remote application.

FIG. 9 is a block diagram illustrating another embodiment for implementing a remote application. The application logic 910 implements the functionality of an application program, and display client 940 implements a user interface. As shown in FIG. 9, to implement the application, application logic 910 communicates with display client 940 in a manner to divide functionality between application logic 910 and display client 940. For this embodiment, display client 940 performs more functions than a purely "thin" client (i.e., display client 940 may be described as a "thicker" client). The display client 940 includes modules to implement a user interface for the application specific to the display capabilities of the display client. To this end, display client 940 includes scene manager 945, scene 950, slots 955, and pre-defined scenes 365. A widget, 960, includes model 930, view 965, and controller 970 components implemented in both application logic 910 and display client 940. The dashed line around widget 960 indicates that the widget is implemented across both application logic 910 and display client 940. Specifically, display client 940 implements controller 970 and view 965 portions of widget 960. The model portion of widget 960 is implemented on application logic 910 (i.e., model 930). As shown in FIG. 9, application logic 910 also includes scene descriptors 920.

In operation, application logic 910 selects an abstract scene for the user interface. To this end, application logic 910 interrogates display client 940 to determine the scenes supported by display client 940 (i.e., scenes available in pre-defined scenes 365). The application logic 910 transmits a scene descriptor (one of scene descriptors 920) to display client 945 to identify the abstract scene. Based on the scene descriptor, the scene manager module 945 instantiates a scene for the user interface. The instantiated scene is depicted in FIG. 9 as scene 950. The scene 950 aggregates through the slots 955 to compose a user interface screen. The slots 955 of scene 950 are populated through use of widget 960. Specifically, input events, input from the user through the user interface, are processed by controller 970. The model to support the slots is provided from the model 930 in application logic 910. Finally, the view of each slot is supported by view module 965, implemented by the display client 940.

Figure 8:
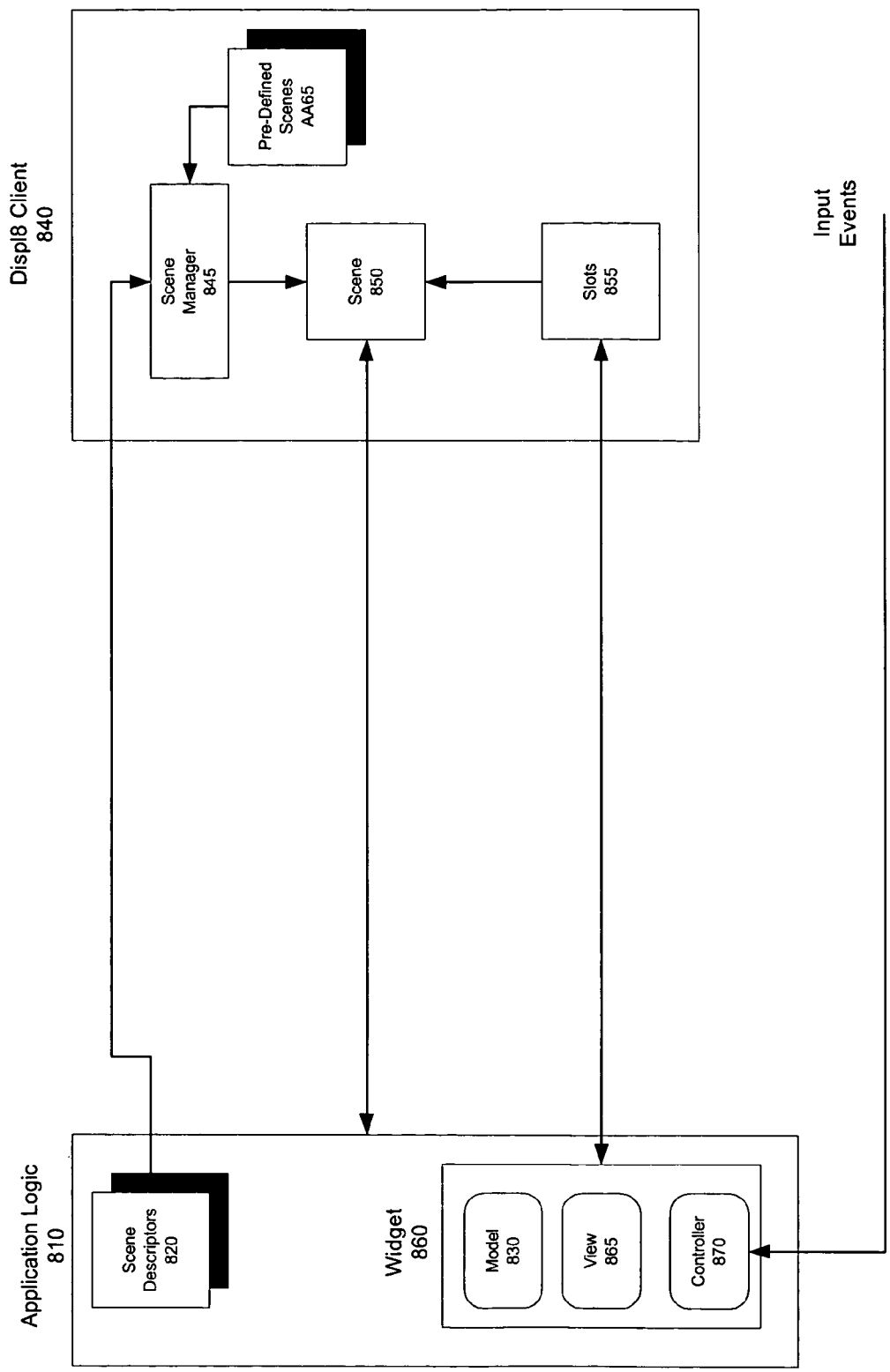
FIG. 8 is a block diagram illustrating a further embodiment for implementing a remote application.

FIG. 8 is a block diagram illustrating a further embodiment for implementing a remote application. For this embodiment, widget 860, supporting the slots for a scene, is implemented entirely on application logic 810. Thus, for this embodiment, display client 840 may be characterized as a "thin" client. Similar to the embodiment of FIG. 9, application logic 810 interrogates display client 840 to determine the available scenes (i.e., scenes available in predefined scenes 865). To implement the user interface on display client 840, application logic 810 transmits, over a network, a scene descriptor to identify an abstract scene. Based on the scene descriptor, scene manager 845 instantiates a scene (e.g., scene 850). The slots for the scene are populated through use of widget 860. Specifically, input events, received from the user interface, are propagated, across the network, to controller module 870. Model 830 provides data to support the user interface slots, and view module 865 supports the view module 865. For this embodiment, both the model and the view modules are implemented on application logic 810. As shown in FIG. 8, the view is communicated back to display client 850. The scene 850 aggregates through the slots 855 to generate a screen for the user interface. The software for the controller portion of a widget may reside locally on a client, or may be invoked across the network from a remote network device.

Figure 10:
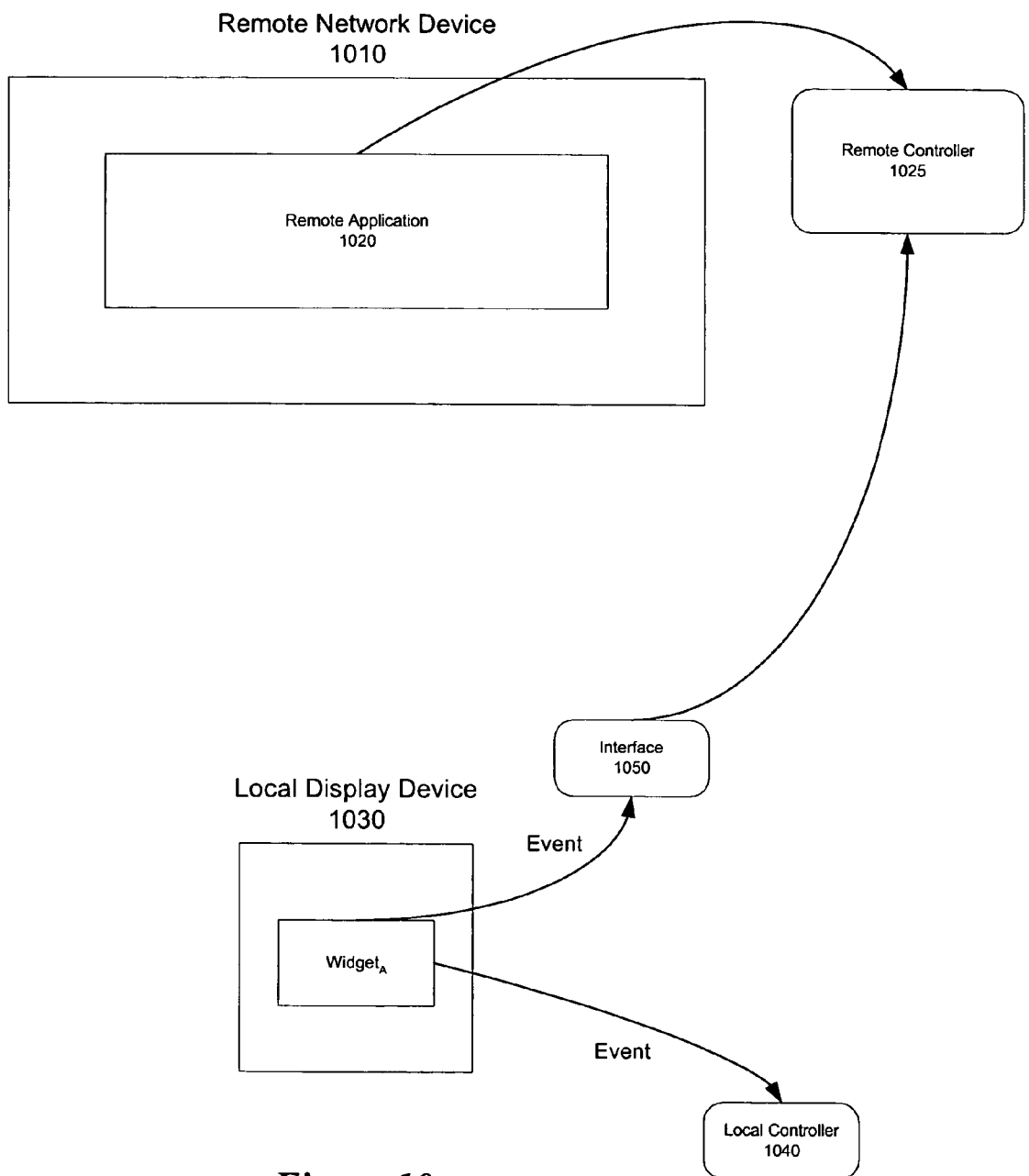
FIG. 10 is a block diagram illustrating one embodiment for implementing widget-based controllers for the remote user interface of the present invention.

FIG. 10 is a block diagram illustrating one embodiment for implementing widget-based controllers for the remote user interface of the present invention. For this example, local display device 1030 instantiates a widget, widget$_4$, to control and render one or more slots of the abstract scene. For this example, widget$_A$ consists of software located on both the local display device 1030 (local controller 1040) and on the client network device 1010 (remote controller 1025). For this implementation, the local controller 1040 processes certain events for widget$_4$. Typically, local controller 1040 may process simple events that are less driven by the application logic. For example, an event may be generated when a user moves the cursor from one item on a list to another. In response to this action, the user interface may highlight each item to indicate the placement of the user's cursor. For this example, a widget may use local controller 1040 to process the event to initiate a new model and view (e.g., render a highlighted menu item on the list).

Other events may require more sophisticated operations from the underlining remote application. In one embodiment, to accomplish this, the remote application (1020), operating on client network device (1010), instantiates a remote controller (1025). In other embodiments, remote controller 1025 may not be a separate object, but may be part of procedural code within remote application 1020. As shown in FIG. 10, widget$_4$, operating on local display device 1030, propagates an event to remote controller 1025 through interface 1050. In one embodiment, widget$_4$ uses a remote procedure call ("RPC") mechanism to invoke remote controller 1025 on remote network device 1010 for operation at the local display device 1030. For example, widget$_4$ may receive an event from a user to select an application displayed on the screen from a menu list of available applications. In response to the event, the remote controller 1025 may generate a top menu screen for the new application. The new top menu screen may require a new scene descriptor, or may use the existing scene descriptor.

Figure 11:
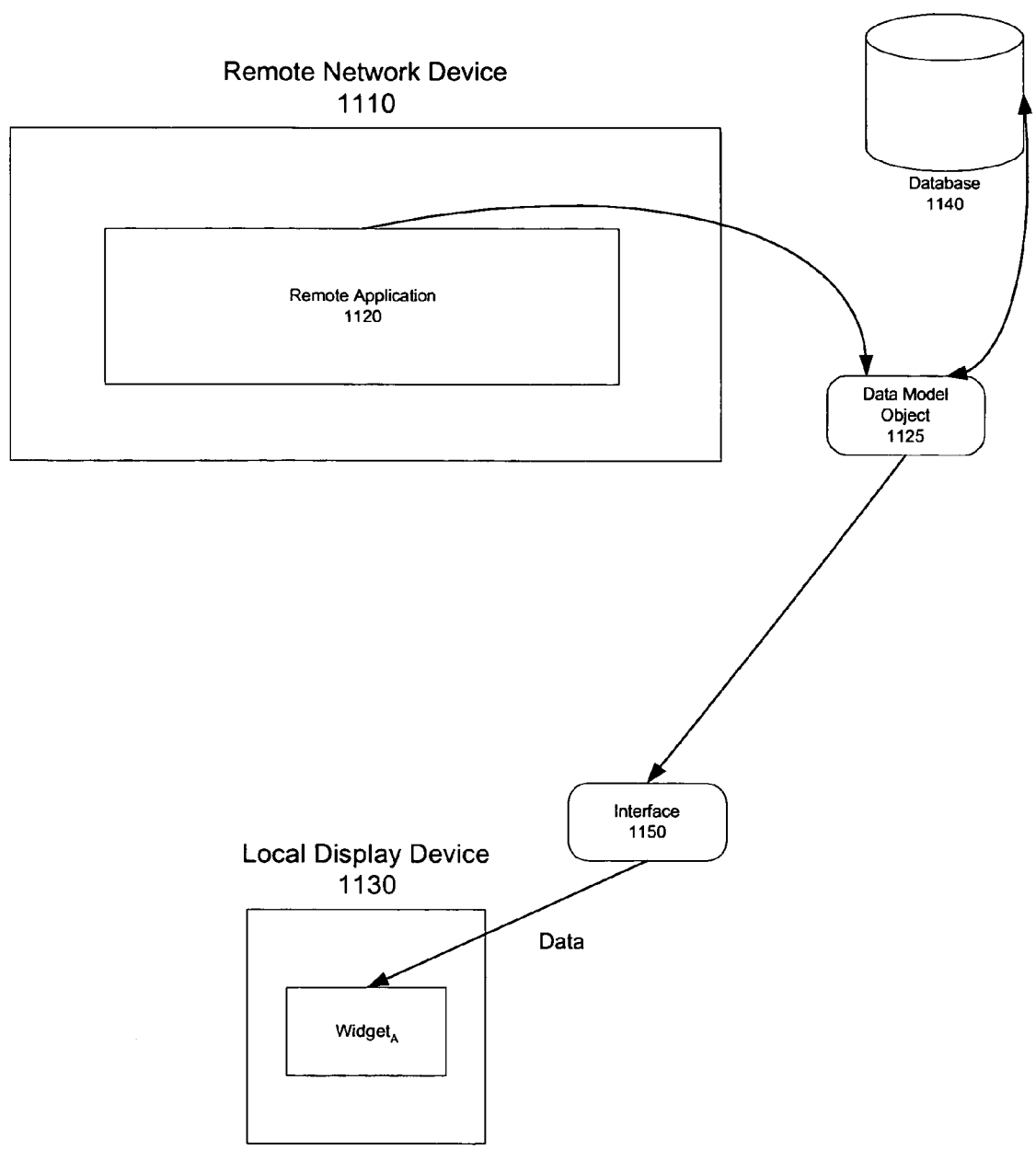
FIG. 11 is a block diagram illustrating one embodiment for providing a model for a user interface.

Data may be supplied to a local display device either locally or from across the network. FIG. 11 is a block diagram illustrating one embodiment for providing a model for a user interface. For this embodiment, local display device 1130 operates remote application 1120 operating on remote network device 1110. The remote application 1120 instantiates a data model object 1125. For this example, data model object 1125 provides an interface to a data store 1140. The data store 1140 may reside on the remote network device 1110, or it may reside anywhere accessible by the network (e.g., another network device or a service integrating the data store from an external source to the network). For this embodiment, the controller (not shown) interprets an event, and invokes the data model object in accordance with the interpretation of the event. For example, in a media system, the controller may interpret an event that requests all available musical tracks within a specified genre. For this request, data model object 1125 may generate a query to database 1140 for all musical tracks classified in the specified genre. As shown in FIG. 11, data model object 1125 communicates the model (data) to local display device 1130 through interface 1150.

In other implementations, the model may comprise a text string. For example, a current UI screen may consist of a list of all high-level functions available to a user. For this example, a user may select a function, and in response, the system may display a list, which consists of text strings, of all sub-functions available for the selected function. In another embodiment, the data model may be provided as a handle to the user interface implementation.

Figure 12:
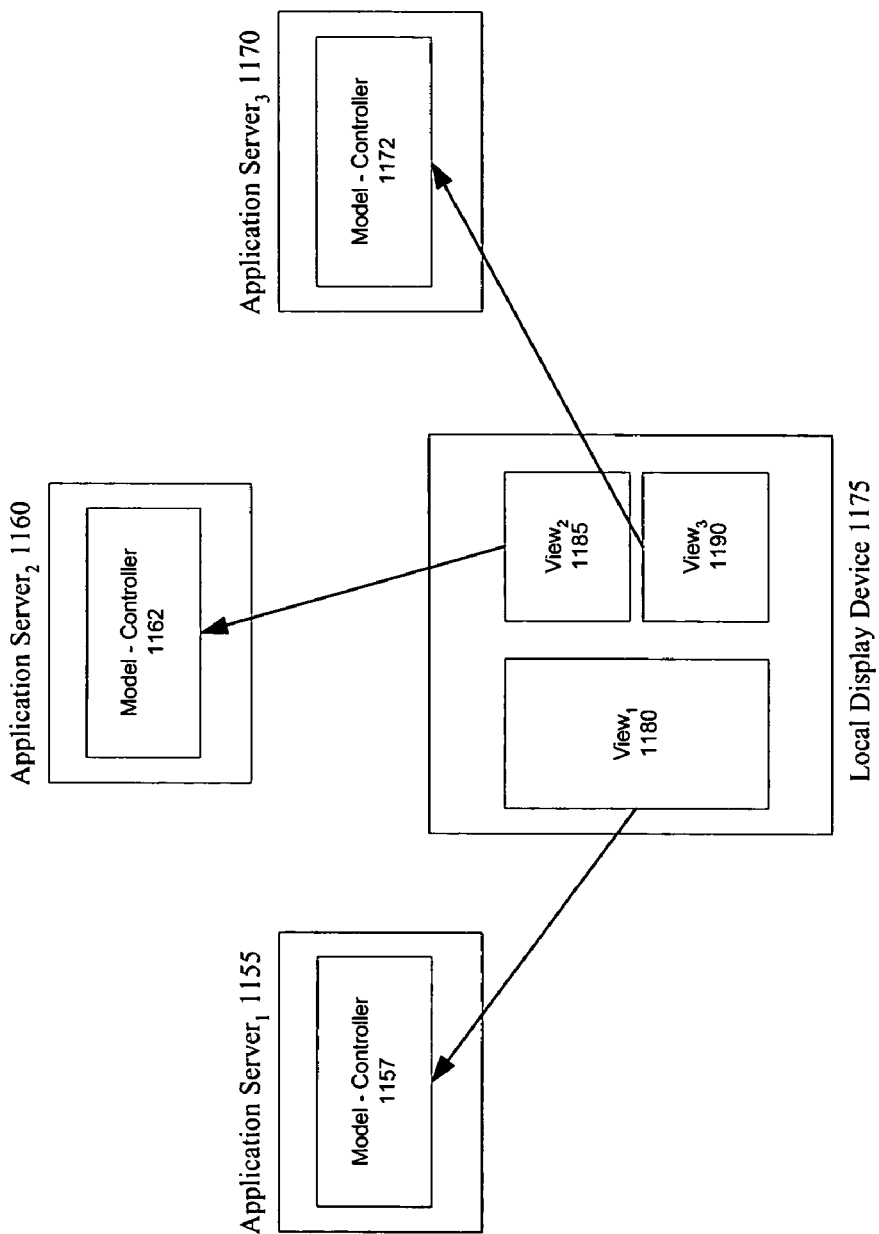
FIG. 12 is a block diagram illustrating another embodiment for a remote application.

FIG. 12 is a block diagram illustrating another embodiment for a remote application. For this embodiment, the widgets for a local display device are highly distributed. For example, one or more widgets may be implemented across multiple devices (e.g., multiple application servers). For the example of FIG. 12, three widgets are utilized to implement the local display device 1175. Although the example of FIG. 12 shows three widgets distributed among three devices, any number of widgets implemented over any number of devices may be implemented without deviating from the spirit of scope of the invention. A first widget, widget$_1$, comprises view$_1$ (1180) implemented on local display device 1175. As shown in FIG. 12, the model-controller (1157) implementation for widget$_1$ is implemented on application server$_1$ (1155). Widget$_2$, which has a view component (1185) implemented on local display device 1175, implements the model-controller component (1162) on a separate device (i.e., application server 2). A third device, application server 3 (1170), implements the model-controller component (1172) for a third widget. As shown in FIG. 12, the view component (1190) for the third widget is implemented on local display device 1175.

The remote application technology of the present invention supports highly distributed applications. For the example shown in FIG. 12, a single display (e.g., local display device 1175) may support three different remote applications. Information for the three applications is integrated on a single display. Since the view component of the widget is implemented on the local display device, the view of information for the remote applications may be tailored to the particular display device.

Figure 13:
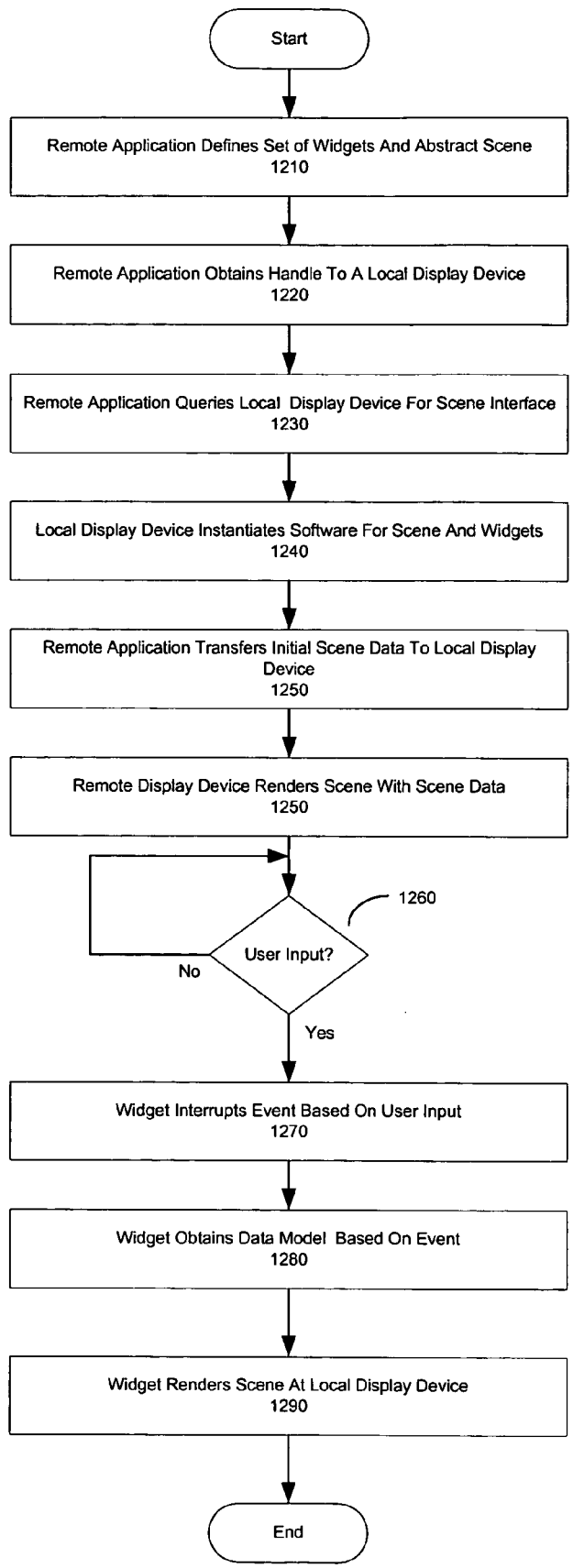
FIG. 13 is a flow diagram illustrating one embodiment for a method to remote an application.

FIG. 13 is a flow diagram illustrating one embodiment for a method to remote an application. First, the remote application defines a set of widgets and selects a scene descriptor that describes an abstract scene (block 1210, FIG. 13). The remote application obtains a handle to the local display device (block 1220, FIG. 13). The handle provides a means for the remote application to communicate with the local display device. The remote application queries the local display device for a scene interface for the defined scene descriptor (block 1230, FIG. 13). In general, the scene interface provides a means for the remote application and local display device to communicate in terms of an abstract scene. To this end, the scene interface defines slots for the abstract scene. For example, to provide a data model, the remote application populates a data structure in the scene interface.

The local display device instantiates software to locally implement the abstract scene and one or more components of one or more widgets (block 1240, FIG. 13). As described above, a widget may incorporate all or portions of the controller, model, view subcomponents of a widget. In one embodiment, the remote application transfers the initial scene data (model) to the local display device through the scene interface (block 1250, FIG. 13). In turn, the local display device renders the initial scene using the data model (block 1250, FIG. 13). When the user submits input to the user interface (e.g., the user selects a menu item from a list), the widget executes control logic based on the user input (i.e., event) (block 1270, FIG. 13). In some embodiments, the controller may be implemented by one or more remote applications. For example, the local display device may include two widgets. The controller of a first widget may be implemented on a first application server, and the controller for the second widget may be implemented on a second application server. In other embodiments, the local display device may implement the controller. A new model is implemented based on interpretation of the user event (block 1280, FIG. 13). In some embodiments, the model may be supplied by one or more remote applications. The local display device may be implemented with four widgets. For this example, a first remote application, running on a first application server, may supply the model for two widgets and another remote application server, running on a second application server, may supply the model for the other two widgets. Also, the widget renders a new scene with the data model supplied (block 1290, FIG. 13).

Figure 14:
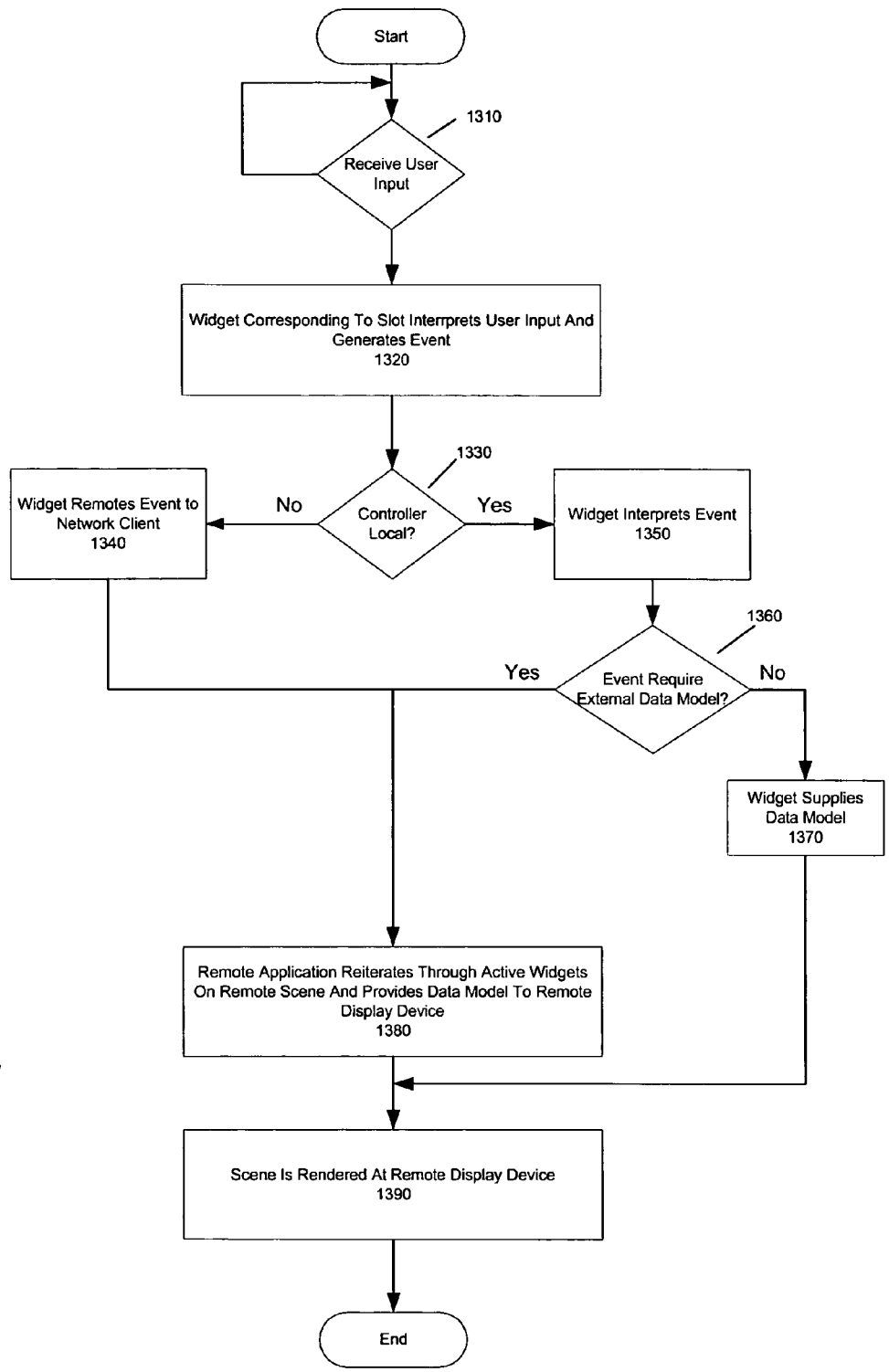
FIG. 14 is a flow diagram illustrating one embodiment for implementing a user interface from a remote application.

FIG. 14 is a flow diagram illustrating one embodiment for implementing a user interface from a remote application. The process is initiated when the user interface receives input from a user (block 1310, FIG. 14). A widget, corresponding to the slot on the abstract scene, interprets the user input and generates an event (block 1320, FIG. 14). For example, if the user selects a menu item displayed in a slot on the abstract scene, then the widget that manages the corresponding slot generates an event to signify selection of the menu item.

If the widget controller for the event is local, then the widget controller, operating on the local display device, interprets the event (blocks 1330 and 1350, FIG. 14). Alternatively, if the widget controller is implemented remotely, then the widget remotes the event across the network (block 1340, FIG. 14). For example, the controller for the widget may reside on one more computers remote from the local display device. If the widget interprets the event locally and the event does not require an external data model, then the widget supplies the data model (blocks 1360 and 1370, FIG. 14). If the event does require an external data model from one or more remote devices (over the network) or the widget remotes the controller over the network to one or more remote devices, then one or more remote applications iterate through the active widgets on the remote scene and provide a data model to the local display device (blocks 1360 and 1380, FIG. 14). Using the data model, the scene is rendered at the local display device (block 1390, FIG. 14).

Two-Way Universal Remote Controller

The present invention has application to configure a two-way universal remote controller. In general, the remote controller may be configured, on the fly, to control any device on the network. Specifically, a user interface, operating as a remote application, is implemented on a remote controller to control a target device. For this application, the remote application (e.g., user interface) runs on a host computer device, and the remote controller, operating as a client device, renders the user interface. As a first "way" of communications, the remote controller, operating as the rendering client, communicates with the remote application to implement the user interface. Then, as a second "way" of communication, the remote controller communicates with the target device to control the target device.

The remote controller may comprise a graphical display to implement a graphical user interface. For example, the remote controller or rendering client may comprise a personal digital assistant ("PDA"), a tablet personal computer ("PC"), a Java® phone, any portable device operating Windows® CE, or a television user interface. In other embodiments, the remote controller or rendering client may be implemented using a character display.

Figure 15:
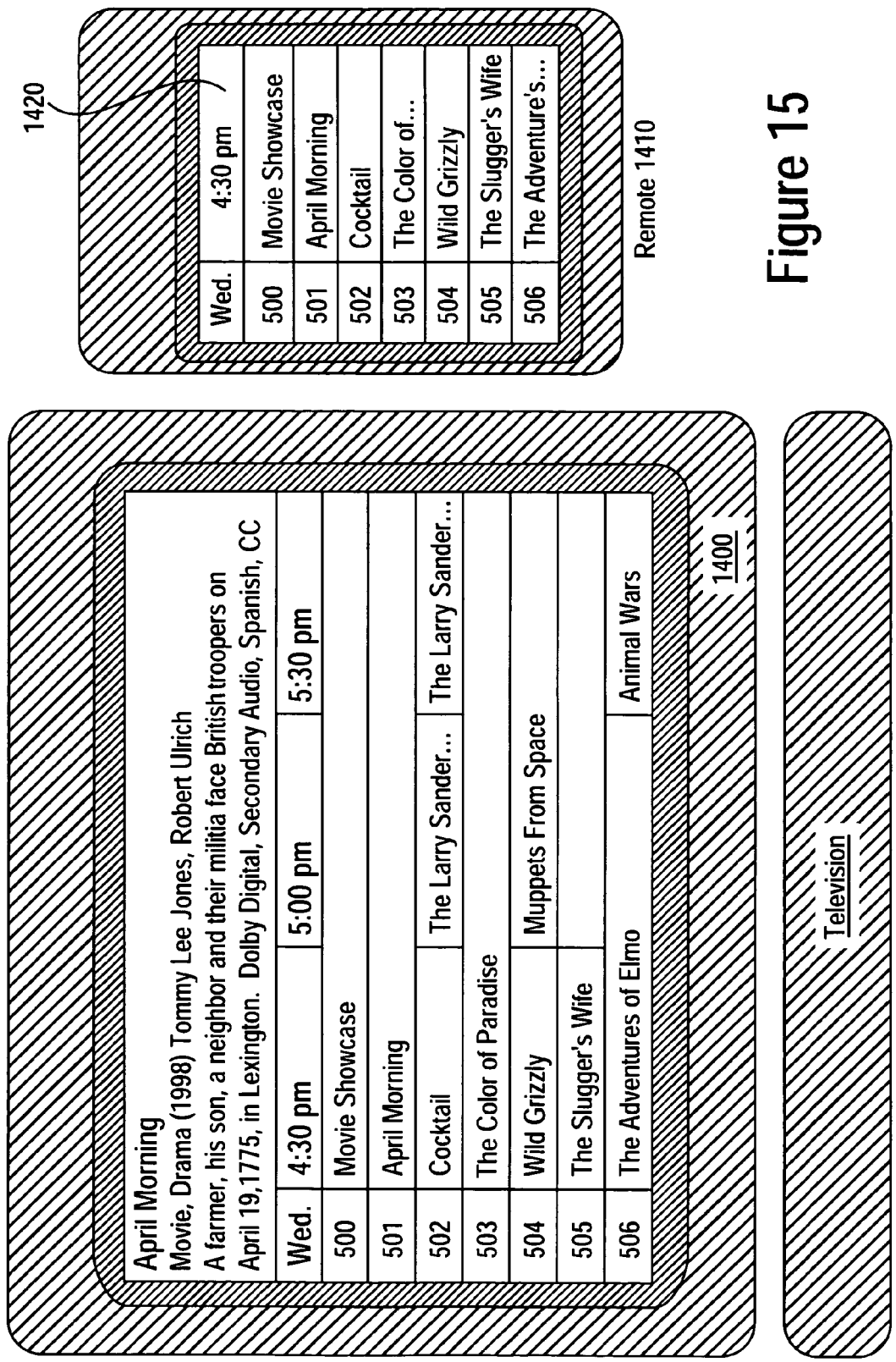
FIG. 15 illustrates an example user interface for a television implemented on a client device.

In one embodiment, the two-way remote controller implements a television user interface. For example, the remote application may implement an electronic programming guide ("EPG") that operates as a user interface. Through use of the EPG, a user may select programming for viewing on a television. FIG. 15 illustrates an example user interface for a television implemented on a client device. For this example, television 1400 displays an electronic programming guide ("EPG"). The EPG permits a user to select programming for viewing on a television. For this embodiment of an EPG, multiple channels are displayed in a first vertical column. For the example EPG displayed in FIG. 15, channels 500-506 are shown. The user may view, on the EPG, additional channels by scrolling up or down, through use of a remote control device, the list of channels displayed in the EPG. Additional vertical columns are displayed that indicate time slots for the channels (e.g., the time slots 4:30, 5:00 and 5:30). As shown in FIG. 15, the EPG displays, beneath the time slot columns, the name of the program playing during that time slot. For example, "Movie Showcase" is playing on channel 500 in time slots 4:30-5:30. On the top of the EPG, information about a selected program is shown. For the example shown in FIG. 15, the program "April Morning" is selected, and information about "April Morning", such as type of programming, genre, actors, short description, and program options, is displayed.

For the example of FIG. 15, a portion of the EPG, displayed on television 1400, is rendered on a client device 1410. For this example, client device 1410 comprises a graphics display 1420. The client device display 1420 may also be sensitive to pressure (e.g., touch sensitive) to permit user input through the display screen. For this example, client device display 1420, which renders the user interface, is smaller than the display of television 1400. Thus, it is not practical or effective to map the user interface directly to the client device display 1420. Therefore, in rendering the user interface on the client device display, only essential information is displayed. For the example rendering shown in FIG. 15, the television column, displaying channels 500-506, and one time slot column, with corresponding programming information, are displayed. A user may scroll, either vertically or horizontally, to view different channels or time slots of programming. The example client device rendering of the user interface does not display metadata of a selected program (e.g., the information regarding "April Morning" shown in television 1400). Thus, the television user interface is rendered on a client device with a small display. The concepts of the present invention may also be applied to generate a user interface for a personal video recorder ("PVR") or a digital video recorder ("DVR").

Figure 16:
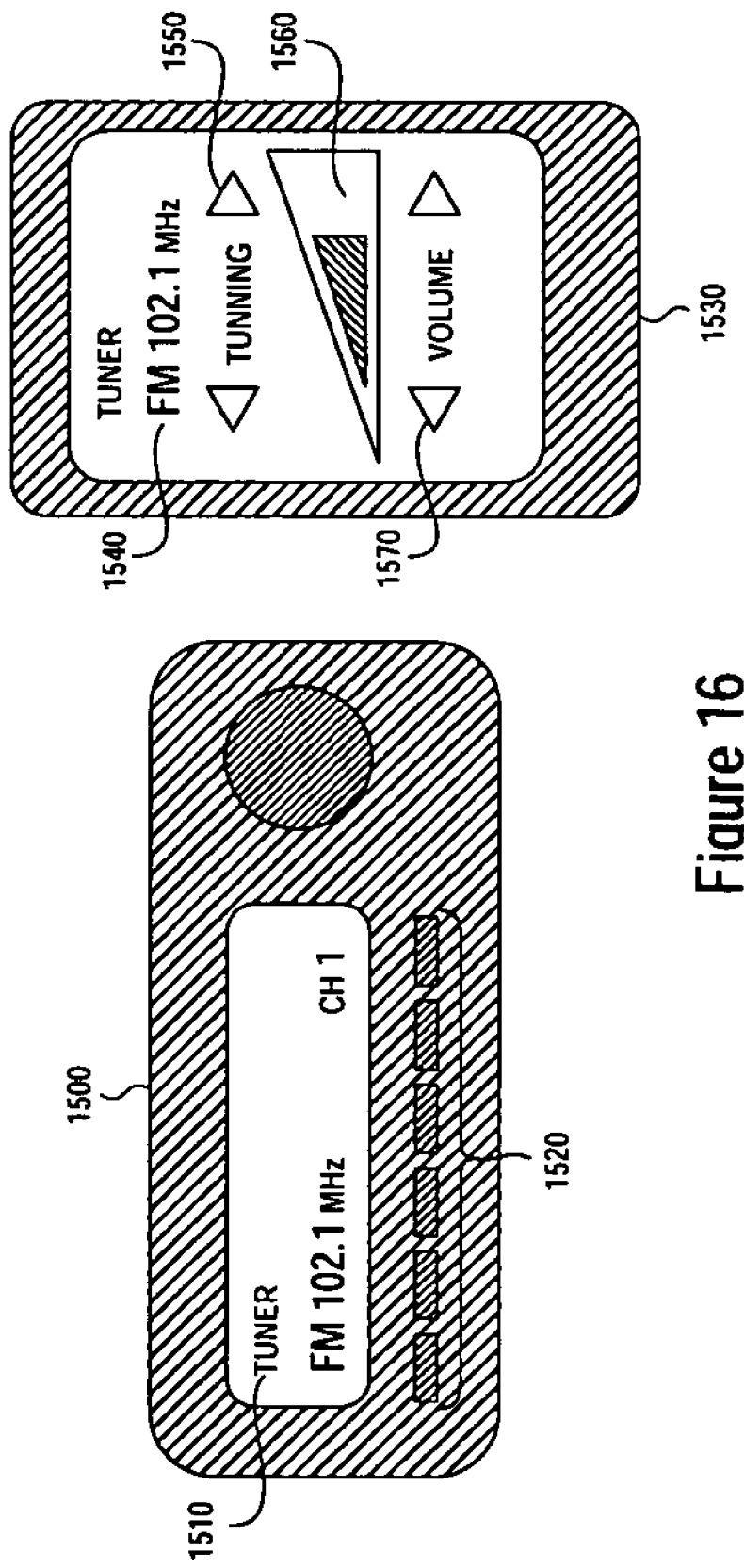
FIG. 16 illustrates one embodiment for rendering a user interface of an audio application on a client device.

The present invention also has application for rendering non-graphical user interfaces on a client device. For example, a user of home media network 200 (FIG. 2) may desire to use remote control 260 to control playback device 240. The playback device 240 may not have a graphical user interface. Instead, the playback device 240 may have a character-based display. FIG. 16 illustrates one embodiment for rendering a user interface of an audio application on a client device. In one embodiment shown in FIG. 16, the target device may comprise an audio-video receiver ("AVR"). The AVR displays information on a character-based display 1510. For example, display 1510 displays the AVR input source (e.g., tuner) as well as additional information (e.g., band and station currently tuned). The user interface on the AVR 1500 further includes buttons 1520 for user input (i.e., the AVR 1500 may also have a remote control specific to the AVR).

For this embodiment, a client device 1530 renders a user interface for the AVR. The client device is not manufactured specifically for the AVR. Instead, a remote application, residing on AVR 1500 or elsewhere, remotes the user interface of the AVR (i.e., target device) to the client device 1530. For this embodiment, the client device 1530 comprises a graphical display 1540, also used as a user input device (i.e., user touches the screen to interact with the user interface). For this AVR example, the client device 1530 renders, as part of the user interface, tuning control 1550 and volume control 1570 for control of the tuning and volume on AVR 1500, respectively. The client device 1530 also renders, as part of the user interface, additional information that specifies the source of the AVR and the station currently tuned as well as a volume indicator 1560. The host application and client device may also be configured to change the user interface based on the mode of operation of the AVR. For purposes of explanation, a single AVR application is presented, however, the target device may comprise a compact disc ("CD") device, a digital video disc ("DVD") device, a digital music playback device, or any device that provides media services to the network.

The techniques of the present invention have application to render a user interface of a media convergence platform to a client device. A user interface for a media convergence platform may present different types of media within a single user interface. In one embodiment, the user interface is television based. For example, the user interface may display, on a television display, selectable items to represent a music application, a photo albums application, and a video application. The user selects an item displayed on the television display to invoke an application. The music application permits a user to select music available within the media convergence platform, and to playback the music through a device accessible through the network. The photo albums application permits a user to select one or more photos available within the media convergence platform, and to view the photos through a device in the media convergence platform. The video application permits a user to select one or more videos or video clips available within the media convergence platform and to playback the video/video clips through a device accessible on the network.

In one embodiment, a two-way remote control device is configured to implement a user interface for a media convergence platform. For example, a host computer device, such as a media server (e.g., PVR-media server 210, FIG. 2), may run an application program to implement the media convergence platform user interface. In one embodiment, the media convergence platform user interface is television based (e.g., implemented on television 250, FIG. 2). In another embodiment, the media convergence platform user interface is implemented on a personal computer (e.g., implemented on personal computer 250, FIG. 2). The application program may remote the user interface to a client device, such as a PDA. Using the client device, the user may control target devices on the network through a rendition of the media convergence platform user interface. This allows the user the ability to use the user interface of the media convergence platform even though the primary display for the user interface is not available or convenient. For example, the media convergence platform may primarily use a television, to display screens for the user interface, and a television remote control to accept input from the user. For this example, a user of the media convergence platform may desire to remote the user interface to a client device because the television is not available or accessible to the user (e.g., the television is not in the same room as the user). Using the client device as a two-way remote, the user may proceed to control a target device (e.g., an audio player in the room with the user).

In one embodiment, the host computer device remotes a user interface to a client device to control another target device on the network. For example, in the home network of FIG. 2, the PVR-media server 210 may run a user interface for playback device 240. Under this scenario, the PVR-media server 210 remotes the user interface for playback device 240 to remote control 260. As another example, media manager 280 may remote a user interface for displaying photos to remote control 260. In turn, remote control 260 may be used to control an application to view photos on television 250. Accordingly, as illustrated by the above examples, an application, which implements a user interface for a remote device, may reside anywhere on the network to control any other device on the network.

Remote Display Applications:

The present invention has application to render display information at a client device from an underlying remote application. An application program, operating on a remote device (e.g., media server), may remote information to a client device (e.g., playback device in a home network). The client device may display the information on a display, such as an LCD. In one embodiment, the client device renders display information to identify media or information about the media. For example, the client device may display information about media playing through the client playback device.

Figure 17:
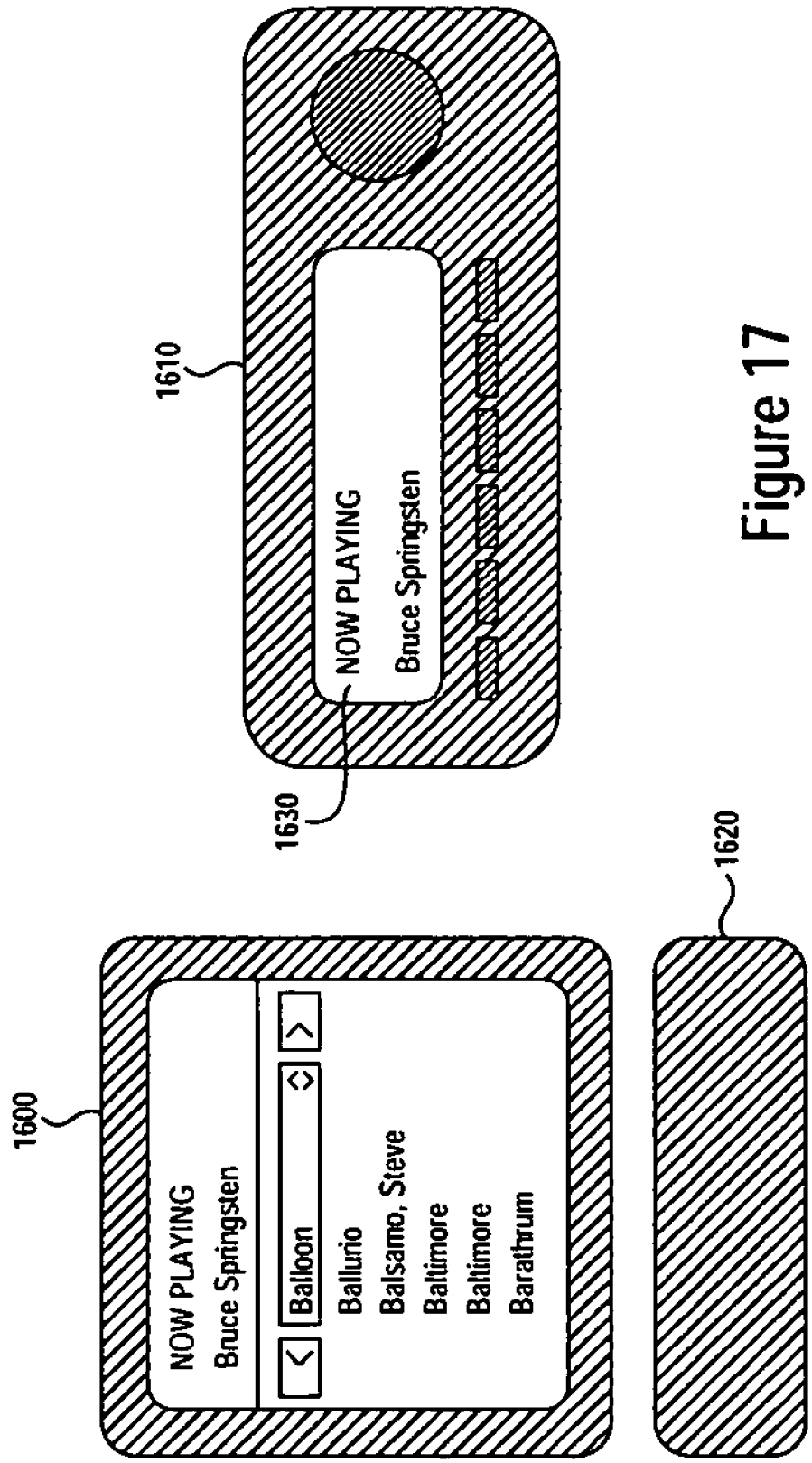
FIG. 17 illustrates an application for the remote display of media information from a media server to an A/V receiver.

FIG. 17 illustrates an application for the remote display of media information from a media server to an A/V receiver. For this example, a media server operates a program to browse, identify and select media. The media server may operate a media convergence platform user interface for browsing and selecting, for playback, video, audio and photos. For the example shown in FIG. 17, media server 1620, with output device 1600, is currently operating an audio application. For this application, output device 1600 displays a list of available audio selections (e.g., albums, tracks, artists, etc.). In addition, output device 1600 displays an identification of the audio track currently playing (e.g., Now Playing Bruce Spingsten). An A/V receiver 1610, coupled to media server 1620, is used as a playback device for media server 1620. A/V receiver also includes a display 1630 (e.g., LCD). For this example, software, operating on media server 1620, remotes display information on A/V receiver 1610 for display on display 1630. Specifically, for this application, the A/V receiver displays information about the current music playing.

In another embodiment, the client device displays video information at a client device. For example, a DVD player may be configured as a playback device to play video from a source on the network (e.g., media server). For example, a media server may supply video (e.g., DVD) for playback at the DVD player. For this example, a display on the DVD player may display the name of the DVD currently playing as well as additional information about the DVD. In other embodiments, a client device may display information about photos or any other type of media.

Although the present invention has been described in terms of specific exemplary embodiments, it will be appreciated that various modifications and alterations might be made by those skilled in the art without departing from the spirit and scope of the invention.

What is claimed is:

1. A method for implementing a user interface on a remote control device for remotely controlling a target device, said method comprising the steps of:

coupling a host computer device, said remote control device, and at least one target device through a wireless network, said remote control device comprising a portable wireless device having a display, the remote control device for remotely controlling said at least one target device through a user interface displayed on said display;

operating an application program on said host computer device, said application program comprising said user interface;

transmitting, using said wireless network, from said host computer device to said remote control device, an identification of at least one scene, said scene defines an abstract layout for at least one screen display of said user interface;

generating at least one screen display for said scene based on an interpretation of said scene at said remote control device;

displaying, on said display of said remote control device, said screen display of said user interface;

receiving input, at said remote control device, from a user to initiate at least one operation at said target device;

communicating, using said wireless network, said at least one operation to said target device; and performing said operation at said target device in response to control from said remote control device, wherein said at least one target device and said remote control device are separate devices, whereby said at least one operation performed at said target device is remotely initiated at said remote control device.

2. The method as set forth in claim 1, wherein said display of said remote control device comprises a graphical display.

3. The method as set forth in claim 1, wherein said user interface comprises an electronic programming guide to control a target device comprising a television, a guide for a target device comprising a personal video recorder, or an interface to control a target device comprising a media playback device.

4. The method as set forth in claim 1, wherein said target device comprises a computer system, a personal video recorder ("PVR") server, a media server, or a television.

5. The method as set forth in claim 1, wherein said target device comprises a device for playing or viewing media.

6. The method as set forth in claim 1, wherein said wireless network comprises a home network.

7. A method for implementing a user interface on a remote control device for remotely controlling a target device, said method comprising the steps of:

operating an application program on a host computer device, said application program comprising said user interface;

transmitting, using a wireless network, from said host device to said remote control device, an identification of at least one scene, said scene defines an abstract layout for at least one screen display of said user interface, said remote control device comprising a portable wireless device having a display, the remote control device for remotely controlling said at least one target device through a user interface displayed on said display;

generating at least one screen display for said scene based on an interpretation of said scene at said remote control device;

displaying, on said display of said remote control device, said screen display of said user interface;

receiving a first user input, at said remote control device, to initiate a first operation at a first target device, said first target device comprising a video media player;

communicating, using said wireless network, said first operation to said first target device;

performing said first operation at said first target device;

receiving a second user input, at said remote control device, to initiate a second operation at a second target device, said second target device comprising an audio media player; and performing said second operation at said second target device, wherein said remote control device, first target device, and second target device are three separate devices, whereby said first operation performed at said first target device is remotely initiated at said remote control device and said second operation performed at said second target device is remotely initiated at said remote control device.

8. The method as set forth in claim 7, further comprising:

coupling said host computer device, said remote control device, and said first and second target devices through said wireless network.

9. The method as set forth in claim 8, wherein said wireless network comprises a home network.

10. The method as set forth in claim 7, further comprising:

receiving a third user input, at said remote control device, to initiate a third operation at a third target device, said third target device comprising a photo media player;

communicating, using said wireless network, said third operation to said third target device; and performing said third operation at said third target device.

11. A method for implementing a user interface on a remote control device for remotely controlling a target device, said method comprising the steps of:

connecting a host computer device, said remote control device, and at least one target device using a wireless local home network, said remote control device comprising a portable wireless device having a display, the remote control device for remotely controlling said at least one target device through a user interface displayed on said display;

operating an application program on said host computer device, said application program comprising said user interface;

transmitting, using said wireless network, from said host computer device to said remote control device, at least one screen display of said user interface;

displaying, on said display of said remote control device, said at least one screen display of said user interface;

receiving input, at said remote control device, from a user to initiate at least one operation at said target device;

communicating, using said wireless network, said at least one operation to said target device; and performing said operation at said target device in response to control from said remote control device, wherein said target device and said remote control device are separate devices, whereby said at least one operation performed at said target device is remotely initiated at said remote control device.

12. The method as set forth in claim 11, wherein said remote control device and said target device are connected to the local home network at different points on the local home network.

13. The method as set forth in claim 11, wherein said target device comprises a device for playing or viewing media.

14. The method as set forth in claim 11, wherein said target device comprises a video, audio, or photo media player.

* * * * *